United States Patent
Foley

(10) Patent No.: US 12,037,114 B2
(45) Date of Patent: Jul. 16, 2024

(54) HANDHELD AIRCRAFT WITH ADJUSTABLE COMPONENTS

(71) Applicant: Mark Bradford Foley, Santa Rosa Beach, FL (US)

(72) Inventor: Mark Bradford Foley, Santa Rosa Beach, FL (US)

(*) Notice: Subject to any disclaimer, the term of this patent is extended or adjusted under 35 U.S.C. 154(b) by 164 days.

(21) Appl. No.: 17/683,439

(22) Filed: Mar. 1, 2022

(65) Prior Publication Data
US 2022/0185475 A1 Jun. 16, 2022

Related U.S. Application Data

(63) Continuation of application No. 16/700,027, filed on Dec. 2, 2019, now Pat. No. 11,292,598, which is a
(Continued)

(51) Int. Cl.
| | |
|---|---|
| *B64C 39/02* | (2023.01) |
| *B64C 27/08* | (2023.01) |
| *B64U 10/10* | (2023.01) |
| *B64U 30/20* | (2023.01) |
| *B64U 50/19* | (2023.01) |
| *B64U 80/00* | (2023.01) |

(52) U.S. Cl.
CPC ............ *B64C 39/028* (2013.01); *B64C 27/08* (2013.01); *B64C 39/024* (2013.01); *B64U 10/10* (2023.01); *B64U 30/20* (2023.01); *B64U 50/19* (2023.01); *B64U 80/00* (2023.01); *B64U 2201/20* (2023.01)

(58) Field of Classification Search
CPC ..... B64C 39/028; B64C 27/08; B64C 39/024; B64U 10/10; B64U 30/20; B64U 50/19; B64U 80/00; B64U 2201/20; B64U 20/83; B64U 10/80; B64U 30/293; B64U 30/29; B64U 10/13
See application file for complete search history.

(56) References Cited

U.S. PATENT DOCUMENTS

| | | | | |
|---|---|---|---|---|
| 2,737,015 | A | * 3/1956 | Wright | B64D 31/12 |
| | | | | 60/224 |
| 4,026,622 | A | * 5/1977 | Siciliano | H01R 13/631 |
| | | | | 439/682 |

(Continued)

FOREIGN PATENT DOCUMENTS

| | | |
|---|---|---|
| CN | 204701765 U | 10/2015 |
| WO | WO 2015109322 A1 | 7/2015 |

OTHER PUBLICATIONS

International Search Report and Written Opinion in PCT Application No. PCT/US2016/065559 dated Feb. 17, 2017.

*Primary Examiner* — Medhat Badawi
(74) *Attorney, Agent, or Firm* — Nixon & Vanderhye, PC

(57) ABSTRACT

The present technology is directed to a remotely controlled aircraft that can be transported without the risk of damaging certain components, such as the arms and/or propellers. In one non-limiting example, the remotely controlled aircraft technology described herein provides a housing that allows the arms of the remotely controlled aircraft to extend and/or retract through openings in the housing. When retracted, the arms and propellers are protected within an area of the structure of the housing, and when extended, the arms and propellers are operable to make the remotely controlled aircraft fly.

17 Claims, 21 Drawing Sheets

Related U.S. Application Data continuation-in-part of application No. 15/372,057, filed on Dec. 7, 2016, now Pat. No. 10,494,094.

(60) Provisional application No. 62/264,678, filed on Dec. 8, 2015.

(56) References Cited

U.S. PATENT DOCUMENTS

| | | | |
|---|---|---|---|
| 4,750,538 A | 6/1988 | Du Quesne | |
| 6,619,353 B1 | 9/2003 | Kim | |
| 7,252,265 B2 | 8/2007 | Perlo | |
| 8,973,861 B2* | 3/2015 | Zhou | B64C 27/20 446/37 |
| 9,185,391 B1* | 11/2015 | Prechtl | G06T 7/593 |
| 9,242,729 B1* | 1/2016 | Wang | B64C 1/063 |
| 9,457,901 B2* | 10/2016 | Bertrand | B64C 27/20 |
| 9,469,394 B2* | 10/2016 | Vaughn | B64C 39/024 |
| 9,550,400 B2* | 1/2017 | Hutson | B64C 39/024 |
| 9,567,076 B2* | 2/2017 | Zhang | B64C 1/00 |
| 9,592,908 B2* | 3/2017 | Gentry | B64C 25/18 |
| 9,599,992 B2* | 3/2017 | Kohstall | B64C 39/024 |
| 9,630,710 B2* | 4/2017 | Hutson | B64C 37/00 |
| 9,676,477 B1* | 6/2017 | Kimchi | B64C 39/024 |
| 9,878,786 B2 | 1/2018 | Chan | |
| 9,896,195 B2* | 2/2018 | Ou | B64C 39/024 |
| 9,902,491 B2* | 2/2018 | Chan | B64C 39/024 |
| 9,908,618 B2* | 3/2018 | Vaughn | G05D 1/0011 |
| 10,011,354 B2* | 7/2018 | Goldstein | B64C 39/024 |
| 10,059,447 B2* | 8/2018 | Wang | B64C 27/08 |
| 10,071,800 B2* | 9/2018 | Boros | B64C 39/064 |
| 10,104,289 B2* | 10/2018 | Enriquez | H04N 23/698 |
| 10,124,888 B2* | 11/2018 | Pounds | B64C 39/024 |
| 10,162,348 B1* | 12/2018 | Scott | B64U 10/13 |
| 10,315,762 B2* | 6/2019 | Diez-Garias | B63G 8/001 |
| 10,479,500 B2* | 11/2019 | Claridge | B64U 20/80 |
| 10,479,501 B2* | 11/2019 | Hoheisel | B64B 1/48 |
| 10,494,094 B2* | 12/2019 | Foley | B64C 27/08 |
| 10,507,698 B2* | 12/2019 | Gonzaga | B60C 25/0545 |
| 10,618,650 B2* | 4/2020 | Hasinski | B64C 39/024 |
| 10,669,024 B2* | 6/2020 | Wang | B64C 35/008 |
| 10,737,794 B2* | 8/2020 | Lee | B64U 10/13 |
| 10,766,610 B2* | 9/2020 | Kidakarn | B64C 39/024 |
| 10,814,970 B2* | 10/2020 | Sinusas | B64C 27/82 |
| 10,831,186 B2* | 11/2020 | Van Niekerk | G05D 1/0033 |
| 10,946,959 B2* | 3/2021 | Nwosu | B64D 27/24 |
| 10,981,649 B2* | 4/2021 | LeGrand | B64C 27/20 |
| 11,014,669 B2* | 5/2021 | LeGrand | B64C 39/062 |
| 11,029,352 B2* | 6/2021 | Blanc-Paques | B64C 39/024 |
| 11,040,782 B1* | 6/2021 | Johnson | F16M 7/00 |
| 11,046,401 B2* | 6/2021 | Fiorello | B63G 8/08 |
| 11,124,295 B2* | 9/2021 | Baek | B64C 39/024 |
| 11,136,119 B2* | 10/2021 | LeGrand | B64C 29/02 |
| 11,147,251 B1* | 10/2021 | Fu | A01K 81/04 |
| 11,292,598 B2* | 4/2022 | Foley | B64C 39/028 |
| 11,453,513 B2* | 9/2022 | Thompson | B64D 47/08 |
| 11,655,026 B2* | 5/2023 | Goldstein | B64C 39/024 244/17.23 |
| 2006/0038059 A1* | 2/2006 | Perlo | B64C 27/20 244/17.23 |
| 2009/0008499 A1* | 1/2009 | Shaw | B64C 27/20 244/17.23 |
| 2009/0224112 A1 | 9/2009 | Carrasco | |
| 2012/0083945 A1* | 4/2012 | Oakley | B64C 25/52 701/2 |
| 2013/0206915 A1* | 8/2013 | Desaulniers | B64C 29/00 244/165 |
| 2014/0061376 A1* | 3/2014 | Fisher | B64D 27/00 244/62 |
| 2015/0321755 A1* | 11/2015 | Martin | B64C 27/08 244/17.23 |
| 2016/0101856 A1* | 4/2016 | Kohstall | G05D 1/0669 244/17.23 |
| 2016/0122016 A1* | 5/2016 | Mintchev | B64C 39/024 244/17.23 |
| 2016/0159471 A1* | 6/2016 | Chan | B64D 47/08 244/39 |
| 2016/0230432 A1* | 8/2016 | Burd | E05B 13/004 |
| 2016/0272317 A1* | 9/2016 | Cho | B60P 3/11 |
| 2016/0340028 A1* | 11/2016 | Datta | B64C 15/12 |
| 2016/0347465 A1* | 12/2016 | Mellor | B64D 29/06 |
| 2016/0376004 A1* | 12/2016 | Claridge | B64C 1/30 701/3 |
| 2017/0118838 A1* | 4/2017 | Williams | H05K 3/027 |
| 2018/0155024 A1* | 6/2018 | Lee | B64C 39/024 |
| 2018/0312253 A1* | 11/2018 | Zhao | B64C 1/30 |
| 2018/0327092 A1* | 11/2018 | Deng | B64C 39/024 |
| 2019/0168871 A1 | 6/2019 | Goldstein | |

\* cited by examiner

HANDHELD AIRCRAFT WITH ADJUSTABLE COMPONENTS

CROSS REFERENCE(S) TO RELATED APPLICATION(S)

This application is a continuation application of U.S. application Ser. No. 16/700,027 filed Dec. 2, 2019, which is a continuation-in-part of U.S. application Ser. No. 15/372,057 filed Dec. 7, 2016, which claim the benefit of Provisional Application No. 62/264,678 filed Dec. 8, 2015, the entire contents of each of which are hereby incorporated by reference in their entirety.

BACKGROUND

The ability to fly is something that has captivated human beings for centuries. Aircraft give us the freedom to easily navigate around the globe in a fraction of the time compared to other methods of transportation. Modern day aircraft has become so sophisticated that aircraft can be flown and operated without the need for any pilot.

Indeed, remotely controlled aircraft can fly without any pilot or any personnel in the aircraft. Modern remotely controlled aircraft (or aerial devices) can even be operated automatically, with electronic circuitry guiding the remotely controlled aircraft to a particular destination. These devices have become so popular, that many individuals can purchase them for recreational purposes.

Certain handheld remotely controlled aircraft can be operated by using an input device to fly the aircraft. For example, certain handheld remotely controlled aircraft allow a user to fly the aircraft using a smartphone or tablet. These remotely controlled aircraft can be outfitted with cameras that allow the user to record video/audio in places that may not be as easy to reach.

Conventional remotely controlled aircraft technology even provides for miniature sized remotely controlled aircraft that could fit in the palm of a user's hand. While these miniature sized remotely controlled aircraft can be easily carried around by a user, conventional remotely controlled aircraft technology has certain drawbacks in that the miniature remotely controlled aircraft cannot be easily transported without the risk of damaging certain components (particularly when the aircraft does not have a case for housing the aircraft). More specifically, the arms and propellers of the aircraft are prone to damage when then user transports the aircraft from one location to another (e.g., during non-use). Thus, there is at least a need for technology that allows miniature-sized remotely controlled aircraft to be transported safely without the risk of damaging components.

BRIEF DESCRIPTION OF THE DRAWINGS

The detailed description is set forth with reference to the accompanying figures.

DETAILED DESCRIPTION OF EXAMPLE NON-LIMITING EMBODIMENTS OF THE TECHNOLOGY

The technology described herein is directed to a remotely controlled aircraft that can be transported without the risk of damaging certain components, such as the arms and/or propellers. In one non-limiting example, the remotely controlled aircraft technology described herein provides a housing that allows the arms of the remotely controlled aircraft to extend and/or retract through openings in the housing. When retracted, the arms and propellers are protected within an area of the structure of the housing, and when extended, the aims and propellers are operable to make the remotely controlled aircraft fly.

Figure 1:
FIG. 1 shows a non-limiting example embodiment of one application for a remotely controlled aircraft 100.

FIG. 1 shows a non-limiting example embodiment of one application for a remotely controlled aircraft 100 (i.e., a remotely controlled aerial device). The aircraft 100 may be operated by a smartphone 200. For example, the smartphone 200 may have an application installed on the phone that allows the phone to direct where the aircraft 100 will fly. In one example, the software on the phone 200 may direct the aircraft 100 so that it will automatically fly to a programmed altitude and point any audio/video recording equipment on the aircraft 100 towards the user holding the phone 200 (e.g., to take a picture of the user).

The aircraft 100 is not limited to being controlled by the smartphone 200 and the technology described herein envisions a variety of methods for controlling the aircraft 100. For example, the aircraft 100 could be controlled by a tablet, a personal computer, a handheld controller, gesture recognition, voice recognition, and/or any other variety of methods available for providing input to a device.

As mentioned above, in one non-limiting example implementation, the user could operate the aircraft 100 so that the aircraft 100 can fly in the air and capture audio/video. For example, the user could deploy the aircraft 100 using the smartphone 200 to enable the aircraft 100 to fly in the air and take a picture of the user. In a sense, the aircraft 100 would act as a "selfie stick" by flying to a position that allows an image to be captured similar to those that are considered "selfie" images.

Figure 2:
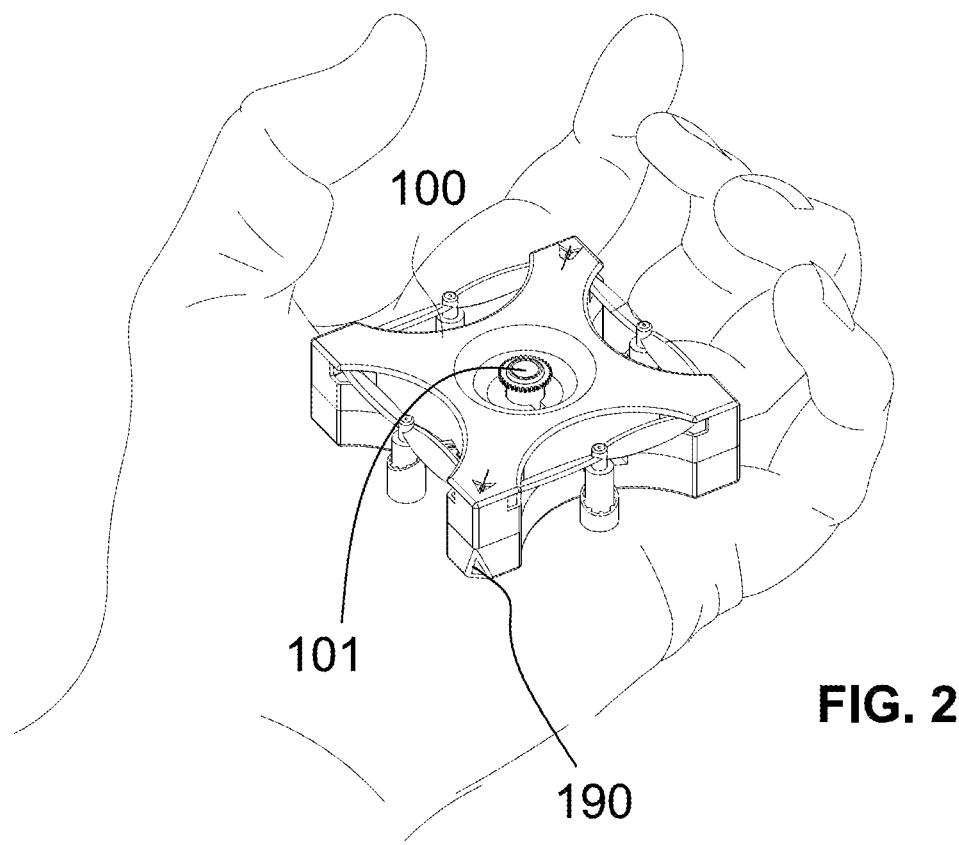
FIG. 2 shows a non-limiting example embodiment of the aircraft 100.

FIG. 2 shows a non-limiting example embodiment of the aircraft 100. As can be seen in FIG. 2, the aircraft 100 is small enough to fit within the palm of a user's hand and can easily fit into a pocket, or other small areas. As one non-limiting example, the aircraft 100 housing may consist of a substantially star (or cross) shape having a button 101 on at least one surface of the housing. One could say that the housing resembles a "ninja star" and can easily be placed in a pocket of a user. The button 101 also allows the arms of the aircraft to expand from the housing thereby allowing the propellers to fly the aircraft 100.

Although the example aircraft 100 shown in FIG. 2 is substantially star-shaped, the technology envisions a variety of different shapes of the housing. For example, the housing of the aircraft 100 could be cube, spherical, cylindrical, triangular, triangular prism, cone, square based pyramid, and/or cuboid shaped.

It should be appreciated that the housing of the aircraft 100 may also include an audio/video capture device 190 (e.g., a camera). The audio/video capture device 190 allows the user to capture audio/video of different scenes that the aircraft 100 is "viewing."

Figure 3:
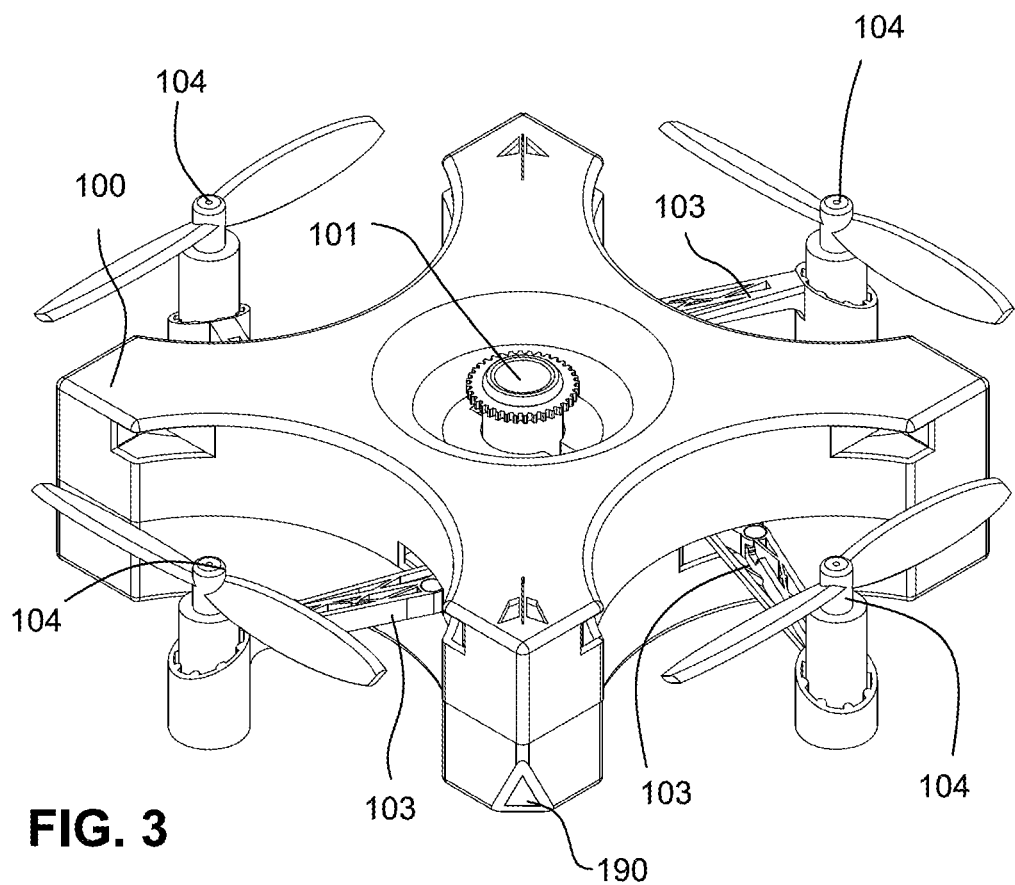
FIG. 3 shows a non-limiting example embodiment of the aircraft 100 with the arms 103 extended from the housing.

FIG. 3 shows a non-limiting example embodiment of the aircraft 100 with the arms 103 extended from the housing. As can be seen in FIG. 3, the arms 103 extend from the housing via openings in the housing. When fully extended, the arms 103 will provide power (e.g., via an electrical connection) from the control system of the aircraft 100 to the propellers 104. Providing power to the propellers 104 will allow the aircraft 100 to fly in the air and aerially navigate.

It should be appreciated that the housing is dimensioned and shaped such that the "grooved" areas of the star-shaped housing form an area where the arms 103 and propellers 104 sit. For example, when the arms 103 are fully retracted, a portion of the arms 103 will rest inside of the housing via openings in the housing, while a portion of the arms 103 as well as propellers 104 will rest outside of the housing in the "grooved" area of the star-shaped housing. When the arms 103 are fully extended, the arms 103 will extend from the openings of the housing such that a portion of the arms 103 and propellers 104 will extend beyond the "grooved" area of the star-shaped housing. Such an arrangement advantageously allows the arms 103 and propellers 104 to rest within a perimeter of the housing outer surface while the device is not being used. In this manner, the arms 103 and propellers 104 will be more protected when they are retracted and not in use (e.g., as they sit in a pocket or bag of a user).

As another non-limiting example, the housing shape could be modified so that the aircraft 100 can fully retract the arms 103 so that the entirety of the arms 103 and propellers 104 are positioned inside the housing of the aircraft 100. For example, if the housing comprised a substantially cube shape, the arms 103 and propellers 104 could fully retract inside the housing structure via openings in the housing. Thus, the propellers 104 and arms 103 could be positioned to sit just inside each respective opening advantageously allowing the arms 103 and propellers 104 to remain inside of the housing when retracted, thus protecting the arms 103 and propellers 104 when the user is carrying the device (e.g., but not using the device).

The user can also extend the arms 103 and propellers 104 by operating the button 101 on a top surface of the housing. As will be described in further detail below, operating the button 101 allows the aircraft 100 to extend and/or retract the arms 103 and propellers 104. For example, by depressing the button 101, the aircraft 100 may extend the arms 103 and propellers 104 away from the housing of the aircraft 100. Similarly, by twisting the button 101, the aircraft 100 may retract the arms 103 and propellers 104 towards the housing. Thus, the button 101 enables the aircraft to extend/retract the arms 103 and propellers 104 so that the aircraft 100 can be easily deployed with little effort by the user while allowing the aircraft 100 to protect the arms 103 and propellers 104 while they are retracted inside an area of the housing of the aircraft 100.

As a non-limiting example (and as can be seen in FIG. 3, for example), the arms 103 of the aircraft 100 are formed at an angle. By forming the arms 103 at an angle, the propellers 104 of the aircraft 100 can sit closer to a center-line of each side of the aircraft. For example, if viewing the aircraft 100 from above (i.e., a "birds eye" view), at least two of the propellers 104 will sit along a same horizontal axis as the center of aircraft 100, and at least two of propellers 104 will sit along a same vertical axis as the center of aircraft 100. By forming arms 103 at such an angle, the propellers 104 can sit along the center of the housing and be positioned closer to the housing. It should be appreciated that the blades of propeller 104 will rotate 360 degrees when operating and at least a portion of the blades may rotate inside the "grooved" area of the star-shaped housing. By having the propellers 104 sit at the center-line of the housing and sit closer to the housing, the aircraft 100 will operate with a substantially better "center-of-gravity" as the aircraft 100 flies. Such an arrangement advantageously improves the aerial movement of the aircraft 100.

As discussed above, the housing of the aircraft 100 may also be outfitted with an audio/video (A/V) capture device 190 (e.g., a camera). The A/V capture device 190 can be used to take images (or video) of different scenes that are being "viewed" by the aircraft 100. In one non-limiting example, the A/V capture device 190 can fly to a position that images the user operating the aircraft 100 to take a "selfie" image of the user. Thus, the aircraft 100 can act as a sophisticated "selfie stick" that enables the user to take selfie images while conveniently operating the aircraft 100.

Figure 4A:
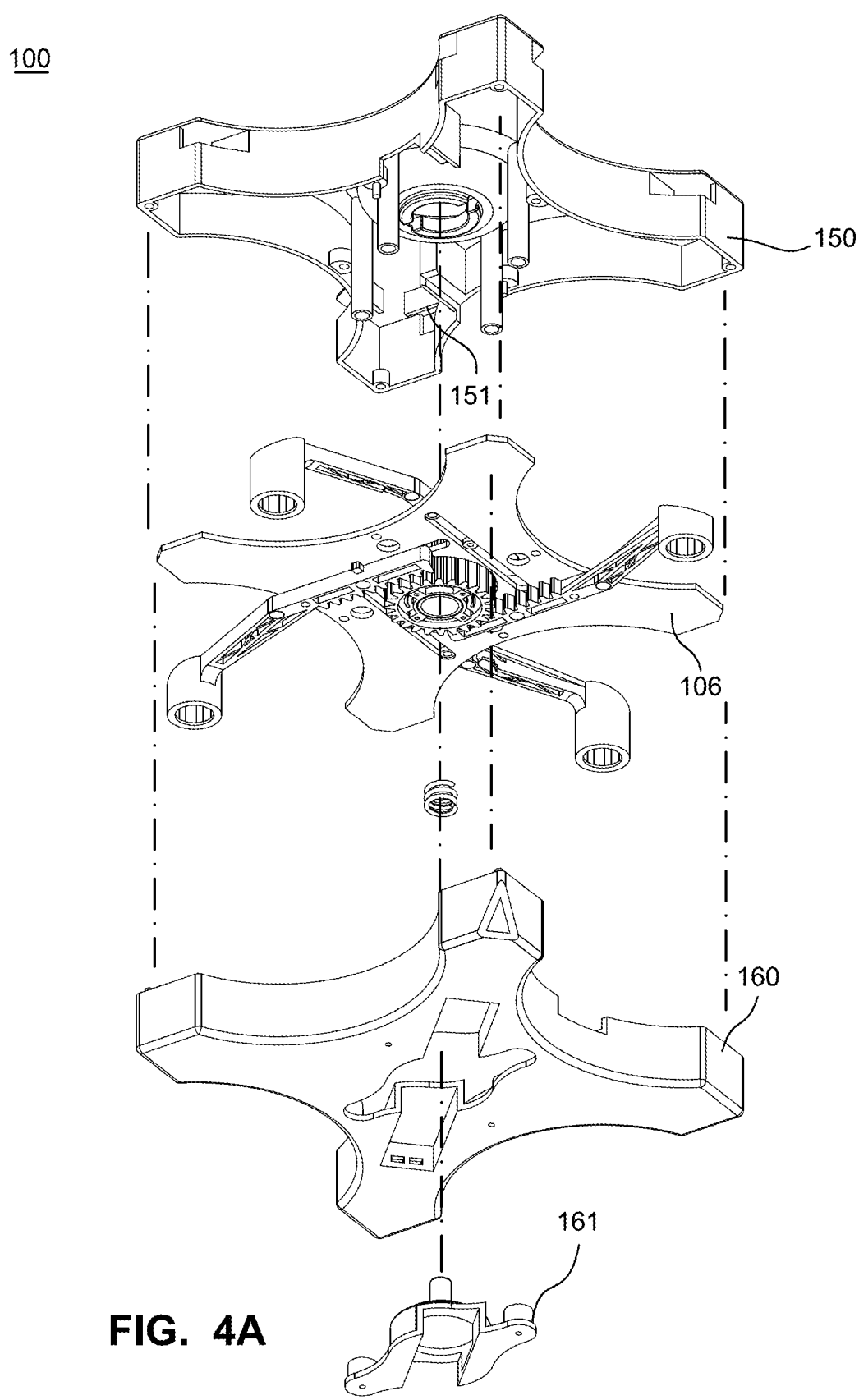
FIGS. 4A and 4B show non-limiting examples of the internal components comprising the aircraft 100.
Figure 4B:
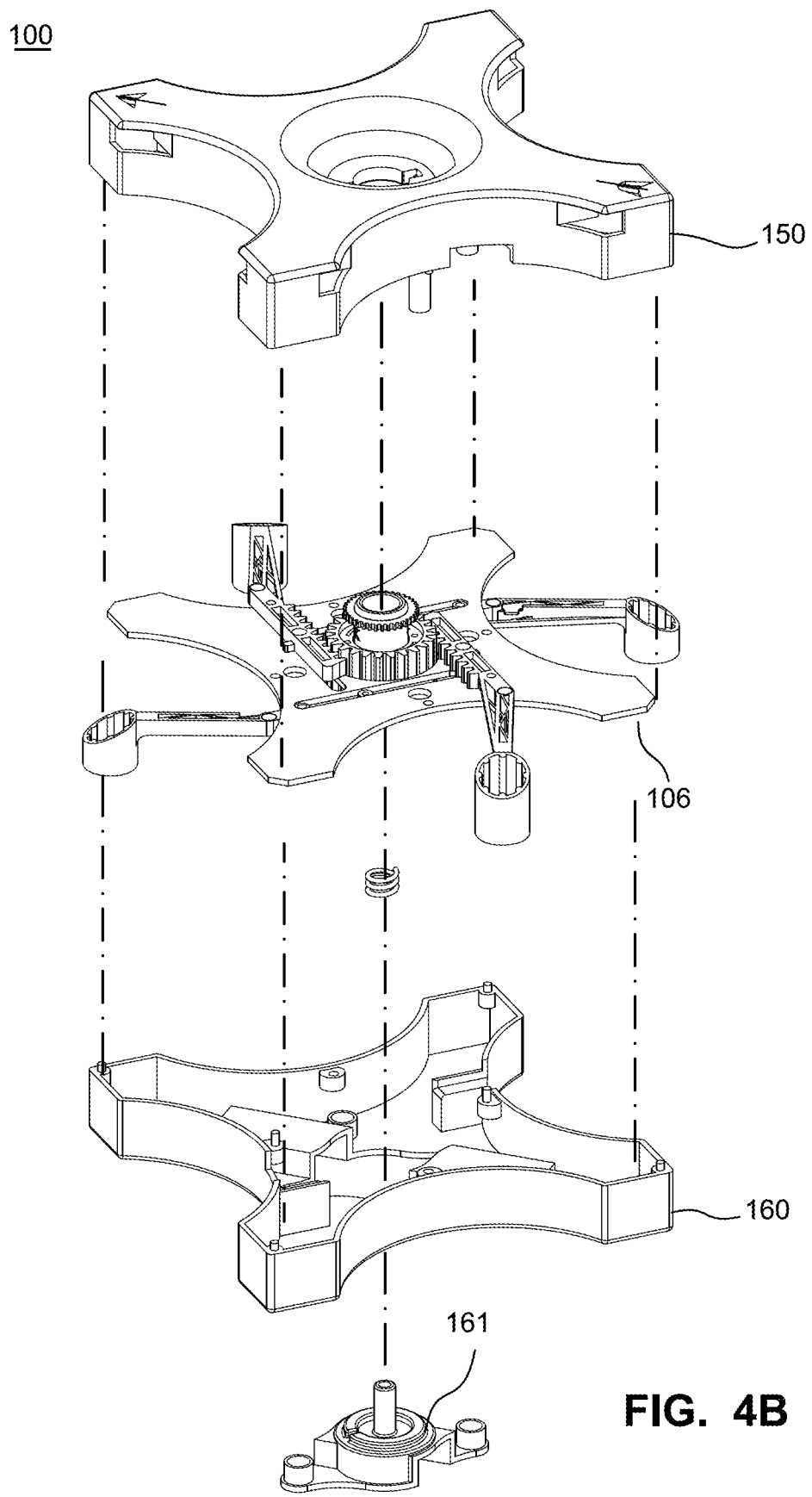

FIGS. 4A and 4B show non-limiting examples of the internal components comprising the aircraft 100. In the examples of FIGS. 4A and 4B, the aircraft 100 can comprise three general components constituting the housing and the portion inside of the housing. In particular, the housing includes an upper portion 150 that includes a top surface of the aircraft 100 as well as a portion of each of the side surfaces that contain the openings for the arms 103. The housing also includes a lower portion 160 that includes a bottom surface of the aircraft 100 as well as a portion of each of the side surfaces containing the other portions of the openings for arms 103.

Inside the housing of the aircraft (i.e., the portion inside the aircraft when upper portion 150 and lower portion 160 are connected) is a frame assembly 106. In this example, the upper portion 150 and lower portion 160 can connect to each other via "pegs" that are insertable from the upper portion 150 into the lower portion 160. When the upper portion 150 is connected to the lower portion 160, the frame assembly 106 is secured in the middle of the housing of the aircraft 100 so that the frame assembly 106 is stable during operation.

As mentioned above, the housing forms a substantially "star" shape where certain portions of the housing have grooves that the arms 103 and propellers 104 rest. The star-shaped housing is formed in such a manner that can force the propeller 104 blades into a specific position when the arms 103 are fully retracted. For example, when the arms 103 began to retract back into the housing of the aircraft 100, the blades on one or more propeller 104 may be in a position perpendicular (or nearly perpendicular) to the side surface of the housing. As the blade of the propeller 104 moves toward the housing, the portion of the "grooved" area extending away from the housing will force the blade of the propeller 104 to move so that the blade becomes parallel (or substantially parallel) to the side surface of the housing. For example, the "grooved" portion (as shown in FIGS. 4A and 4B) comprises a substantially hemi-spherical shape. The portion of the substantially hemi-spherical shape (close to the diameter of the hemisphere) of the housing will force the propeller 104 into alignment when the propeller 104 makes contact with the housing. As such, the formation of the housing advantageously forces the blade of the propeller 104 to a position that prevents the blade of the propeller 104 from sticking out of an opening of a perimeter on a side of the housing.

As can also be seen in FIG. 4A, the lower portion 160 of the housing includes a compartment that is filled in by bottom connection portion 161. In one example embodiment, the compartment can open and close, by removing or attaching connection portion 161, so that a user can insert an object into the lower portion 160 of the housing. For example, the compartment could be configured to include battery connection components where the user can insert one or more batteries for powering the aircraft 100. In this case, the lower portion 160 of the housing would also comprise electrical contacts that form an electrical connection with the frame assembly 106 thereby delivering power to the electrical components on the frame assembly as well as the propellers 104.

Figure 5A:
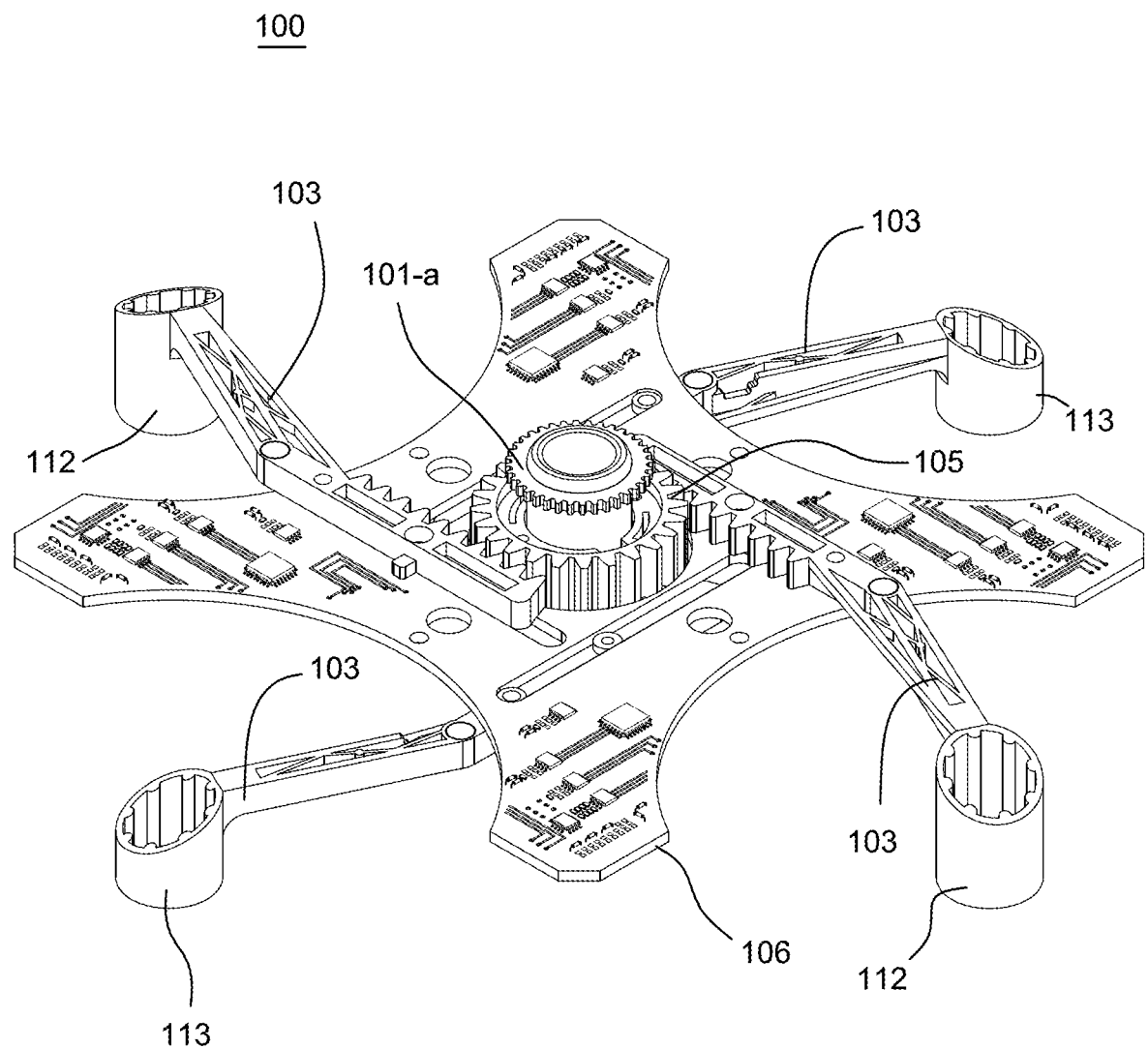
FIGS. 5A and 5B show non-limiting examples of the frame assembly 106 and the components associated therewith.
Figure 5B:
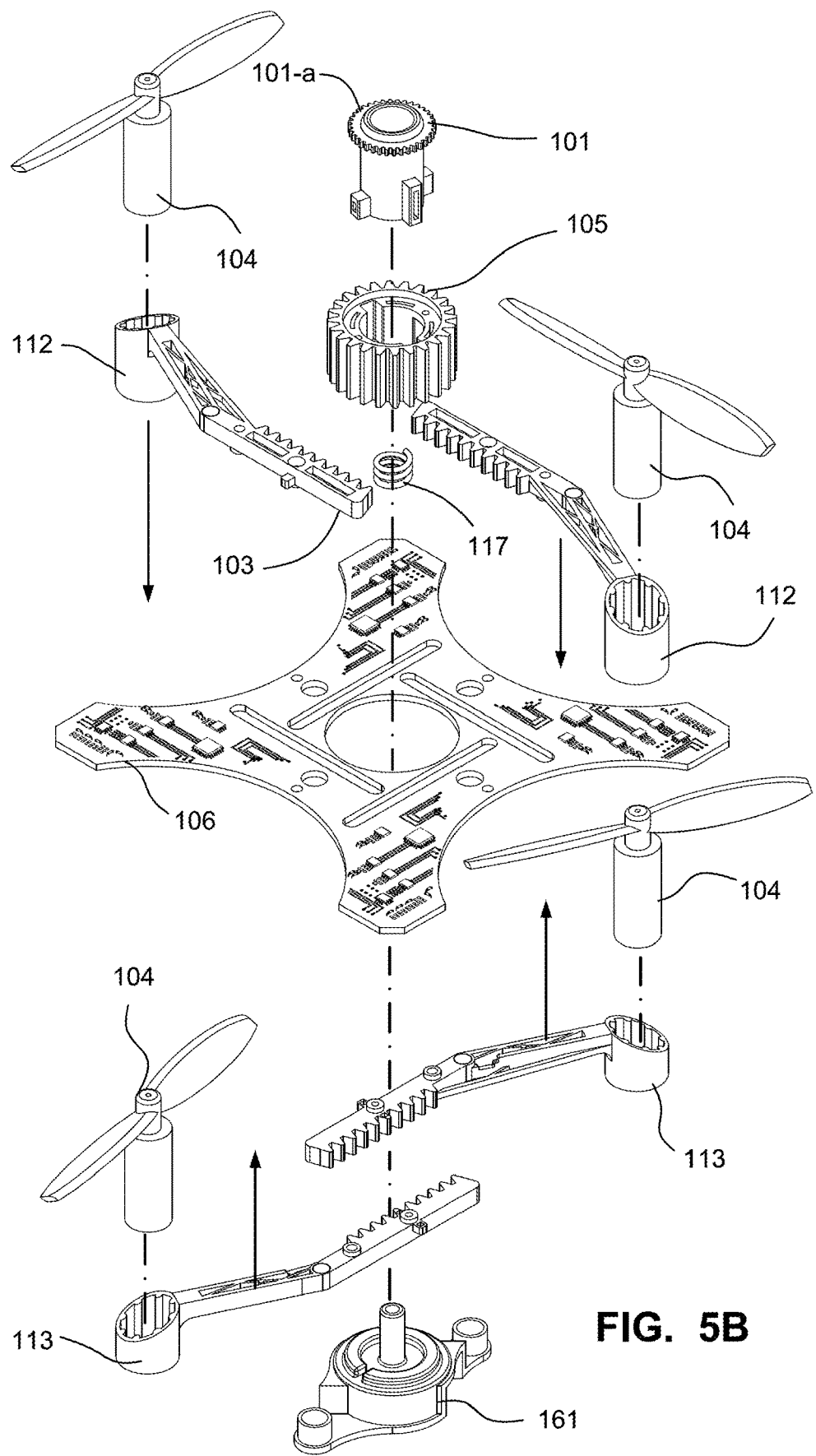

FIGS. 5A and 5B show a non-limiting example of the frame assembly 106 and the components associated therewith. FIG. 5A depicts the aircraft 100 when all components are assembled along the frame assembly 106. FIG. 5B shows an exploded view of the internal components and frame assembly 106. As can be seen in FIGS. 5A and 5B, the frame assembly 106 can also be formed in a star-shaped pattern to conform with the upper portion 150 and lower portion 160 of the housing of the aircraft 100.

As a non-limiting example, the aircraft 100 can comprise a button 101, one or more arms 103, a gear 105, and a frame assembly 106. Each arm 103 can also include one or more propellers 104. The propellers 104 can be connected to the shaft of one or more different types of motors that can either be seated within buckets 112 or flat platforms that are attached to each arm 103.

The arms 103 comprise "teeth" that fit within grooves of the gear 105. Thus, when the gear 105 rotates, the arms will move to extend/retract based on the rotation of the gear 105. That is, the grooves of the gear 105 will turn thereby pushing the "teeth" of the arms 103 to move the arms 103 in a direction corresponding to the movement/rotation of the gear 105. Put another way, the grooves of the gear 105 will push the "teeth" of the arms 103 to move the arms 103 horizontally (or parallel) to the frame assembly 106.

The gear 105 can sit within an opening of the frame assembly 106. In the example shown in FIGS. 5A and 5B, the opening of the assembly 106 is substantially circular thereby allowing the substantially circular gear 105 to fit seamlessly within the opening of the assembly 106. The gear 105 can also be operated using the button 101. In one example, the button 101 can be depressed to rotate the gear 105 allowing the arms 103 to be extended from the housing of the aircraft 100. For example, depressing the button 101 can move the gear 105 in a clockwise fashion as the button moves to a depressed position. When the gear 105 moves clockwise, the arms 103 will extend from the opening of the housing of the aircraft 100.

The gear 105 can also be rotated by "twisting" the button 101. That is, once the button 101 has been depressed and the gear 105 has rotated, the button 101 can be "twisted" to rotate the gear 105 in the opposite direction of that when the button 101 is depressed. As can be seen in FIGS. 5A and 5B, the button 101 can include button teeth 101-*a* aligned around a circumference of button 101. The button teeth 101-*a* allow the button 101 to be more easily gripped by fingers of a user.

It should be appreciated that the button 101 is not limited to including "teeth" for gripping the button and could be designed in a variety of ways that enable the user to better grip the button 101. For example, the button 101 could include grooves that enable users to easier grip the button 101. Of course, these examples are non-limiting and the technology described herein envisions a variety of methods for more easily operating the button 101.

By "twisting" the button 101, the gear 105 will rotate in a manner that can retract the arms 103 within the inside of the housing of the aircraft 100. For example, when the button 101 is "twisted," the button 101 can move to the non-depressed state and the gear 105 may move counter-clockwise thereby retracting the arms 103 via the movement of the gear 105. Thus, the arms 103 can be easily retracted by simply "twisting" the button 101.

It should be appreciated that the button 101 can use a spring 117 (shown in FIG. 5B) to support the motion of pushing the button 101 downward to rotate gear 105, as well as releasing the button 101 to the non-depressed state. In this example, the spring 117 will remain compressed whether the button 101 is in the depressed state (e.g., arms 103 fully extended) or the non-depressed state (e.g., arms 103 fully retracted). The spring 117 will also be under a constant twisting tension to twist/rotate in a particular manner. For example, the spring 117 may naturally be under a constant twisting tension to twist in a clockwise fashion as the spring 117 is further compressed. As the button 101 transitions from the non-depressed state to the depressed state (e.g., arms 103 extended), the spring 117 will compress further while simultaneously twisting in a clockwise manner (i.e., to follow the natural clockwise twisting tension of the spring 117). Because button 101 is attached to the spring 117, the button 101 will be forced to twist with the spring 117 as the downward pressure is applied to the button 101 thus causing the pegs on button 101 to force gear 105 to rotate with the button 101. The movement of the gear 105 will then cause the arms 103 to extend outwards until they are fully extended from the housing of the aircraft 100. The button 101 can "lock" into place using a stopping component of the button 101 (e.g., the "pegs"), and the spring 117 will remain compressed and attempt to force the button 101 outward.

However, the button 101 will remain "locked" until a user releases the button 101. For example, a user could rotate the button 101 in a counter-clockwise fashion releasing the "lock" state of the button 101. In doing so, the spring 117 will be twisted against its natural twisting tension in a counterclockwise fashion, while providing an upward/outward force that will cause the spring to decompress. As the spring 117 moves counterclockwise, the button 101 will also move in the same manner causing the gear 105 to follow the movement. Consequently, the arms 103 of the aircraft 100 will begin to retract into the housing based on the rotation of the gear 105. Using the stopping components (e.g., pegs) on the button 101, the button 101 will extend from the housing, but will be prevented from coming out of the housing. Thus, the button 101 will reach an extended state thereby retracting the arms 103 and keeping the spring 117 in a compressed state.

It should be appreciated that the movement of the gear 105 to extend the arms 103 by moving clockwise, and retract the arms 103 by moving counter-clockwise is a non-limiting example and the technology described herein envisions a variety of ways in which the aims 103 can be extended and/or retracted. For example, the aircraft 100 could be configured such that movement of the gear 105 in a clockwise fashion could instead retract the arms 103 where movement of the gear 105 in a counter-clockwise fashion could extend the arms 103.

The arms 103 contain buckets 112, 113 in which the propellers 104 can sit and be held. The propellers 104 can comprise at least a base portion and a neck portion to which the propeller 104 wings attach, and the base and neck portion can sit within each respective bucket 112, 113. It should be appreciated that the base portion of the propellers 104 could comprise a motor for operating the respective propeller 104, and the motor could electrically connect to a power source attached to the frame assembly 106 via a wire along the arms 103. In one example, the neck portion of the propellers would extend from a top opening of each bucket 112, 113. In the example shown in FIGS. 5A and 5B, the buckets 112 on arms 103 sitting on top of the assembly 106 are larger than the buckets 113 on arms 103 affixed to the bottom of the assembly 106. This arrangement allows the base of each bucket 112, 113 to be on the same plane while the tops of the buckets 112 sit on a different plane than the other two buckets 113. Such a configuration advantageously allows the aircraft 100 to use propellers having the same size neck (and base) and allows each of the propellers to sit at the same height as they sit in the buckets 112, 113. More specifically, because the base of each bucket 112, 113 sits along the same plane, assembly of the aircraft 100 does not require the different sized buckets to have different sized propellers (e.g., having different size neck lengths). Furthermore, the arrangement allows for each propeller 104 to sit at the same height from the base of each bucket thus ensuring that each propeller 104 sits on the same plane (e.g., for proper aerodynamics). Thus, in this example, the necks of propellers 104 extending from the top portion of buckets 112 affixed to the top of the assembly 106 will not extend as far as the neck of propellers 104 extending from the top portion of buckets 113 affixed to the bottom of the assembly 106.

It should be appreciated, however, that the aircraft 100 is not limited to such an arrangement and the technology envisions a variety of other arrangements. For example, the buckets 113 may be bigger on arms 103 that are affixed to the bottom of the assembly 106 than the buckets 112 on arms 103 that are affixed to the top of the assembly 106. In this case, the length of the propeller 104 necks may vary depending upon which bucket 112, 113 the propeller 104 sits. Moreover, the aircraft 100 may also use brushless motors that do not require a bucket 112 but can screw into a flat portion on arm(s) 103.

The aircraft 100 can also include circuitry operating as a control system for the aircraft 100. For example, the aircraft 100 can include, at least, one or more processors, one or more memories, one or more transceiver devices, one or more input/output devices, and/or one or more power sources. The electronic circuitry, in one non-limiting example, can be formed as part of a printed circuit board that forms the frame assembly 106. That is, the printed circuit board may be designed such that it takes the form of the frame assembly 106 with different electrical components being affixed to the frame assembly 106 via the printed circuit board. Thus, the circuit board having the different electrical components comprising the control system could be designed to have a form factor matching the design of the frame assembly 106.

FIG. 5B shows an exploded view of the internal components of the aircraft 100. Similar to FIG. 5A, the aircraft 100 shown in FIG. 5B includes a button 101, one or more arms 103, a gear 105, and a frame assembly 106. As can be seen in FIG. 5B, two arms 103 are configured to be positioned on a top surface of the assembly 106 where two other arms 103 are configured to be positioned on a bottom surface of the assembly 106. This allows the aircraft 100 to include two arms 103 that extend along one horizontal axis while having two arms 103 that extend (on the other side of the assembly 106) along another horizontal axis. As can be also seen in FIG. 5B, and as mentioned previously herein, the gear 105, button 101, and spring 117 can fit within an opening of the assembly 106. Likewise, the arms 103 also include components that fit within openings of the assembly 106 allowing the arms 103 to move along the assembly 106 when extending/retracting.

As also shown in FIG. 5B, each arm 103 has a respective bucket 112, 113 in which a propeller 104 will be affixed and sit. As mentioned previously, each propeller 104 will be connected to a motor that can power the propeller 104. In one example, the arms 103 attached to buckets 112 can be positioned on top of the assembly 106 while the arms 103 attached to buckets 113 can be positioned on the bottom of the assembly 106. Again, this arrangement advantageously allows the propellers 104 base to sit at the same plane while the propeller 104 wings sit at the same height from the base.

Figure 6:
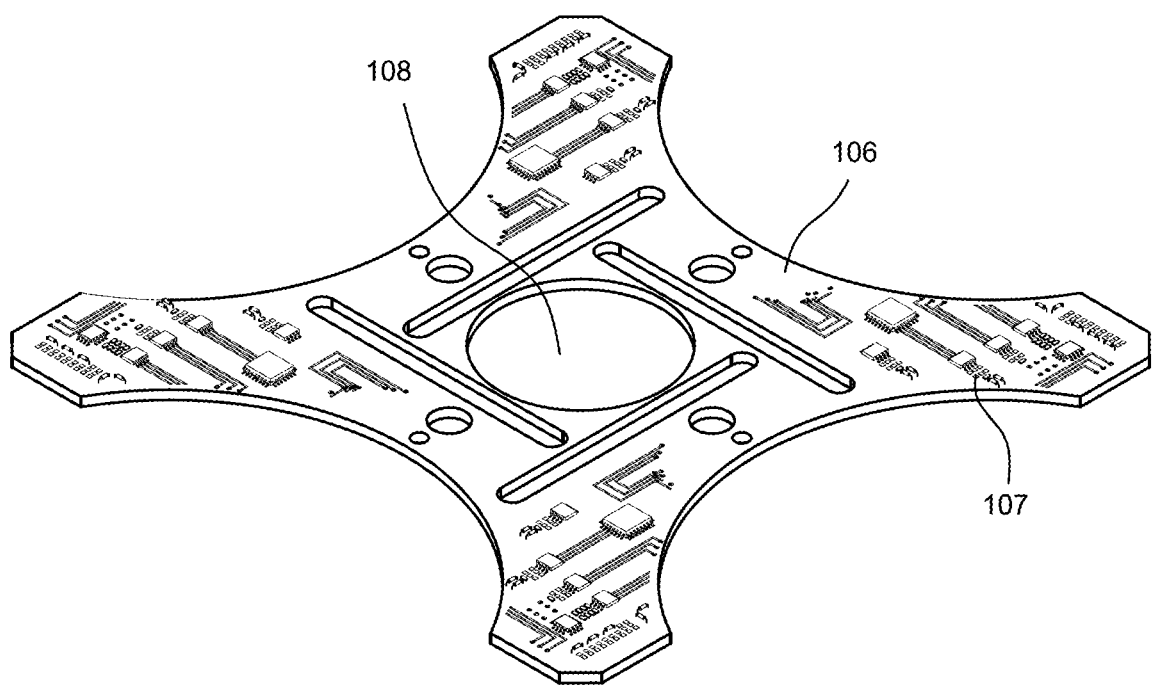
FIG. 6 shows a non-limiting example assembly 106 having several components attached to the assembly 106.

FIG. 6 shows a non-limiting example assembly 106 having several components attached to the assembly 106. In one example, assembly 106 includes circuit components 107 that are affixed to the assembly 106. The circuit components 107 can be affixed to either or both of the top of assembly 106 and/or the bottom of assembly 106. The circuit components 107 can also be integrated within any portion of the assembly 106 and are not limited to such an arrangement.

As also seen in FIG. 6, the assembly 106 includes an opening 108 in which various components can be positioned. For example, and as shown in at least FIG. 5B, the gear 105, button 101, and spring 117 can be positioned in the opening 108 so that they can seamlessly sit inside the assembly 106 when the aircraft is fully assembled. Such an arrangement advantageously allows components of the aircraft 100 to sit inside the assembly 106 while the circuit components 107 reside on portions of the assembly 106 and surround the other portions of the aircraft 100 (e.g., button 101, gear 105, arms 103).

It should be appreciated that the circuit components 107 are positioned on the assembly 106 while various openings on the assembly 106 allow for other components to reside. As noted, opening 108 is one example of such an opening that allows the button 101, spring 117, and gear 103 to sit when operating the aircraft 100. Likewise, the assembly 106 contains other openings for the arms 103 to sit as they extend into and out of the aircraft 100. Thus, the assembly 106 is designed in a manner that allows the circuit components 107 for operating the aircraft 100 to advantageously be positioned on portions of the assembly 106 that allows for more efficient placement of the other working parts.

The circuit components 107 include several electronic components that are used to power and control the aircraft 100. For example, circuit components 107 could include a battery that powers the aircraft 100. The battery could comprise any type of battery including, but not limited to, lithium polymer, lithium ion, alkaline, zinc-carbon, lead-acid, mercury, and/or silver oxide. The battery could be rechargeable or replaceable, and the technology does not envision just a single battery where the aircraft 100 could use multiple batteries. In another example, circuit components 107 could include electrical connections to be powered from a battery (or any other electrical source) not physically mounted to the assembly 106.

Circuit components 107 could also include a processing system that includes at least one processor, at least one memory, and at least one input/output (I/O) device for processing input/output to the aircraft processing system. The processing circuitry can also include at least one data transmission device for sending/receiving data to/from the aircraft 100 to a separate device (e.g., a mobile phone, tablet, computer). The data transmission device may use any form of communication, including wireless communication (e.g., WiFi, Bluetooth, IR). The circuit components 107 can also provide power to the propellers 104 and can power each individual propeller 104 (or simultaneously power more than one, or all propellers 104).

FIGS. 7A-7J show non-limiting examples of arms 103 used to hold propellers 104 for operating the aircraft. As mentioned above, in a non-limiting example embodiment, arms 103 can be formed at an angle so that the propellers 104 sit at the center-line of the housing. In one embodiment, the angle that the arms 103 can be bent could form approximately a 25 degree angle. Of course, this example is non-limiting and the arms 103 can be formed at any variety of angles.

Figure 7A:
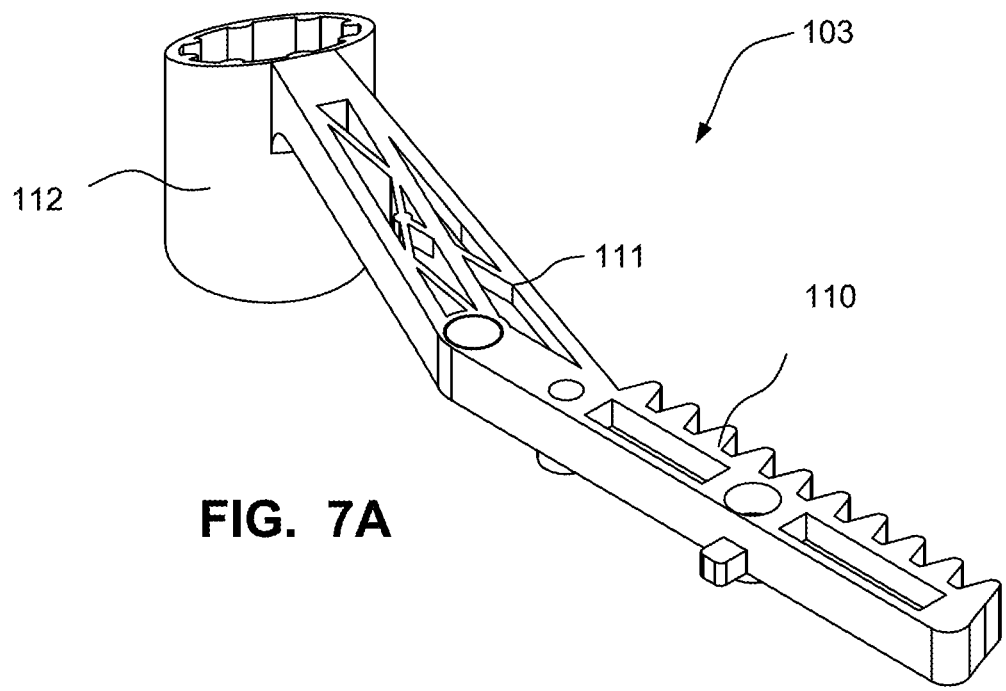
FIGS. 7A-7J show non-limiting examples of arms used to hold propellers for operating the aircraft.
Figure 7B:
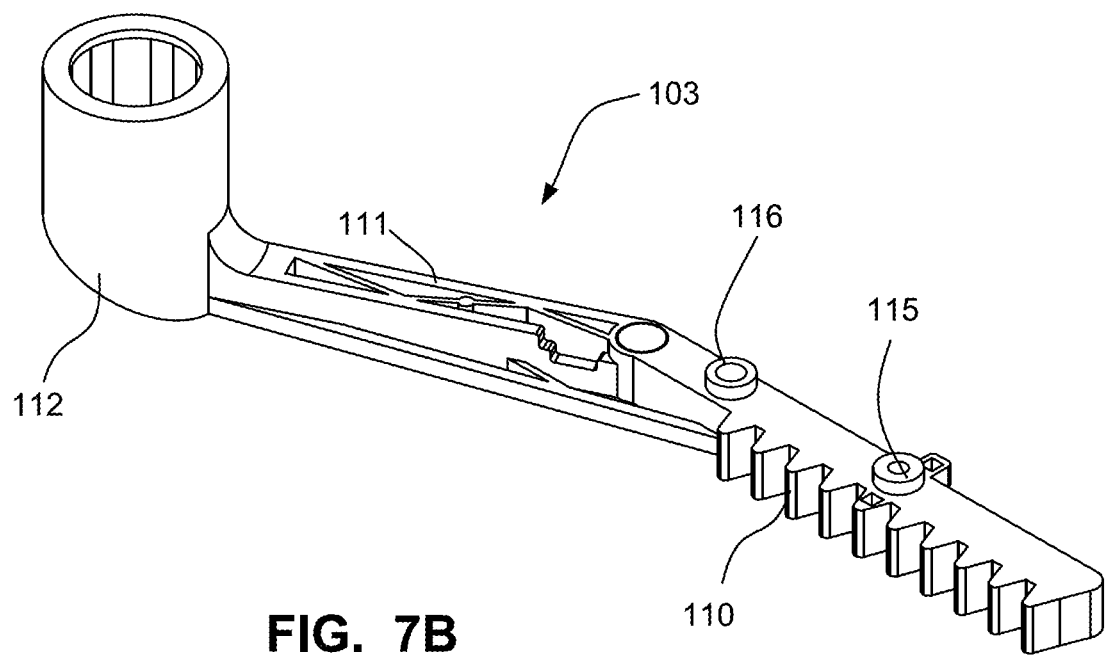
Figure 7C:
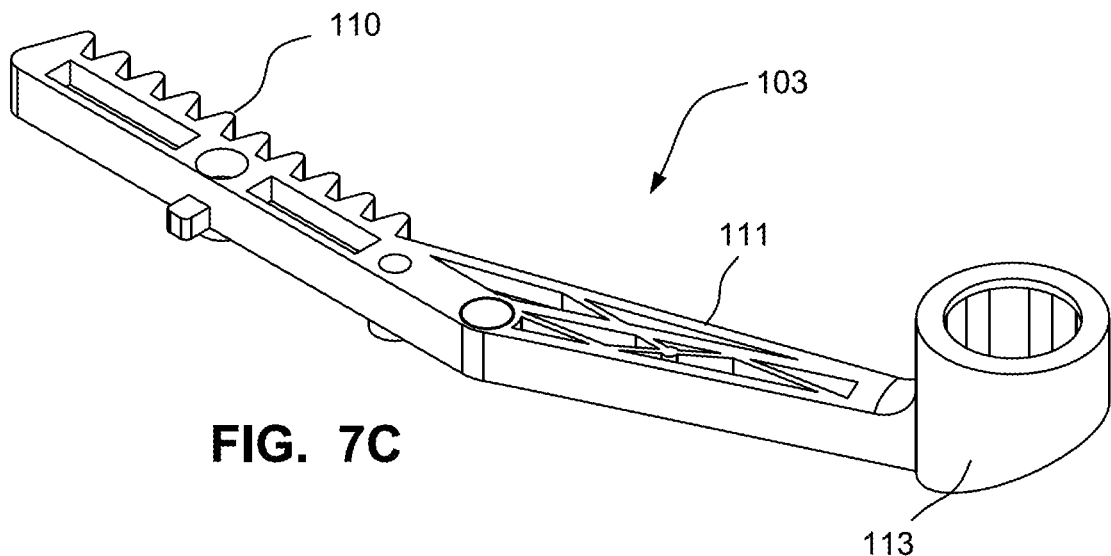
Figure 7D:
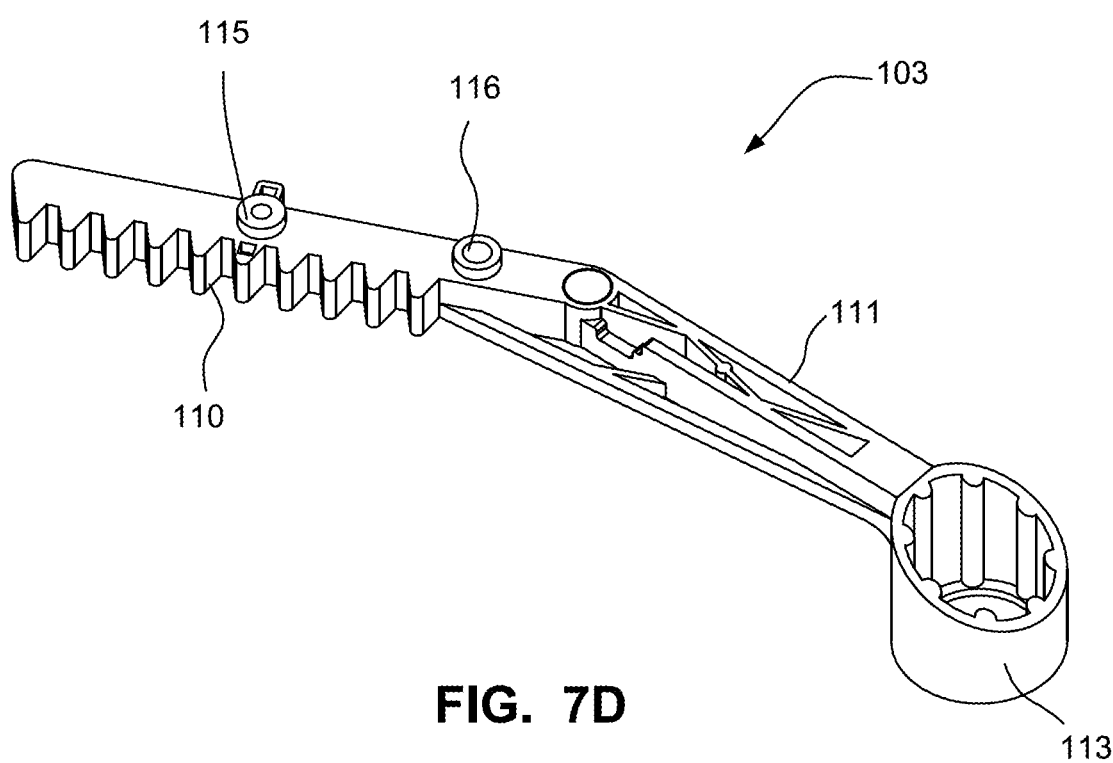

FIGS. 7A and 7B also show arms 103 having the larger buckets 112 that sit on top of the frame assembly 106 where FIG. 7B shows the arm 103 turned upside down from the arm 103 shown in FIG. 7A. FIGS. 7C and 7D specifically show arms having the smaller buckets 113 that sit on the bottom of the frame assembly 106. Likewise, the arm 103 shown in FIG. 7D is shown as upside down from the arm 103 shown in FIG. 7C.

In this example, arms 103 each have respective buckets 112, 113 that can seat one or more propellers 104 (which include respective motors). As discussed previously, bucket 112 in one example (shown in FIGS. 7A and 7B) can be larger in size than bucket 113 (shown in FIGS. 7C and 7D). Likewise, arms 103 holding bucket 112 can be positioned along a top surface of the frame assembly 106 where arms 103 holding bucket 113 can be positioned along a bottom surface of the frame assembly 106.

In FIGS. 7A-7D, arms 103 are shown as being separated into two components. For example, the arms 103 have one component corresponding to the teeth 110 and another component corresponding to the extender portion 111. These components can be separated by a contact portion. The teeth 110 can be used to abut the teeth on gear 105 for extending/retracting the arms 103. For example, as the gear 105 rotates the teeth on gear 105 will continuously abut (or mesh) with the teeth 110 on arms 103 to push the arms either inward or outward of the housing of the aircraft 100 depending on whether the gear 105 rotates clockwise or counter-clockwise. Thus, the teeth 110 component of arms 103 can be said as being used to maneuver the arms inside and outside of the housing of the aircraft 100.

Extender portion 111 of arms 103 is used to extend the arms 103 outside of the housing of the aircraft 100. Although not shown in FIGS. 7A and 7B, a wire can extend along the arms 103 through the extender portion 111 to provide power to propellers 104 seated in buckets 112, 113. For example, the wire could be connected to a power supply (e.g., battery) on the frame assembly 106 and each wire could extend along arms 103 to power each propeller 104. More specifically, the wire could be attached to a power transfer contact on the arm that, when paired with the contact point on the frame assembly, would receive power from a battery connected to the frame assembly 106. In another example, the wire could be connected to a portion of the arm 103 and can be activated by a switch that turns ON and OFF when the arm 103 extends from and retracts towards the housing of aircraft 100.

In one example, the wire could be activated to provide current to each propeller 104 when the arms 103 extend to a point allowing the propeller 104 to "switch" ON. This can be accomplished via a contact. For example, a contact area can have one or more electrical contacts connected to the wire for powering propellers 104. When the arms 103 extend to a fully extendable position, the contact area can make contact with electrical contacts on frame assembly 106 (as can be seen further in FIG. 8A, for example). Thus, the propellers 104 will not be powered until the contact reaches the end of the assembly 106 thus preventing the propellers 104 from accidentally being activated when not fully extended. Thus, the contact acts as a switching mechanism for powering each respective propeller 104. It can be appreciated that this method of providing power to the propeller 104 is one non-limiting example, and the technology herein envisions a variety of methods for providing power to the propeller 104. Details regarding the electrical connection(s) for powering the propellers are discussed in further detail below, and throughout this document.

As mentioned above, the contact could be removed in favor of a switch that contacts one or more arms 103. For example, when the arm 103 is fully retracted, a portion of the arm 103 can push the switch in a direction indicating an OFF state for the power (thus providing no power to propellers 104). When the arm 103 is fully extended, the portion of the arm 103 can push the switch in a direction indicating an ON state for the power (thus powering propellers 104). Such an arrangement advantageously allows the propellers 104 to be switched ON and OFF without using the contact.

Arms 103 also contain maneuvering pegs 115, 116 (and/or electrical contact 117) for guiding the arms 103 throughout respective openings in the frame assembly 106. For example, maneuvering pegs 115, 116 (and/or electrical contact 117) slide along the openings of the assembly 106 as the arms 103 extend and retract out of and into the housing of the aircraft 100. In one example, peg 115 could be used to stop the arm 103 from retracting too far into the housing of the aircraft 100 by abutting an end of the opening in assembly 106. Likewise peg 116 could be used to stop the arm 103 from extending too far outside of the housing of the aircraft 100 by abutting an opposing end of the opening of the assembly 106. Thus maneuvering pegs 115, 116 (and/or electrical contact 117) allow the arms 103 to retract/extend from the housing of aircraft 100 while also stopping the arms 103 from moving too far out of the housing or moving too far inside of the housing.

It should be appreciated that these drawings show two maneuvering pegs 115 and 116. However, the technology described herein is not limited to such an example and the arms 103 may contain any number of maneuvering pegs including, but not limited to, zero, one, three, and/or four or more maneuvering pegs. It should be further appreciated that maneuvering pegs 115 and/or 116 may form electrical contacts (e.g., electrical contact 117) for establishing a connection between a power source and each propeller, the details of which are discussed in further detail below.

FIGS. 7E-7J show non-limiting example embodiments of arms 103 with further detail of the electrical components used to power certain devices (e.g., propellers 104). FIGS. 7E-7J specifically show various components for providing power to propellers 104 using one or more electrical power sources (e.g., battery). In one non-limiting example, an electrical contact 117 is shown forming part of the arm 103.

It should be appreciated that the electrical contact 117 may be similar to (or same as) one or more of the maneuvering pegs 115/116 (shown in FIGS. 7A-D, for example). Likewise electrical contact 117 may be different from maneuvering pegs 115/116 and may be a separate component from maneuvering pegs 115/116. Moreover, electrical contact 117 may be positioned on arm 103 in addition to one or more of maneuvering pegs 115/116 or may be used on arm 103 placed opposite to maneuvering pegs 115/116. These examples are of course non-limiting and the technology described herein envisions any arrangement and use of electrical contact 117.

Figure 7E:
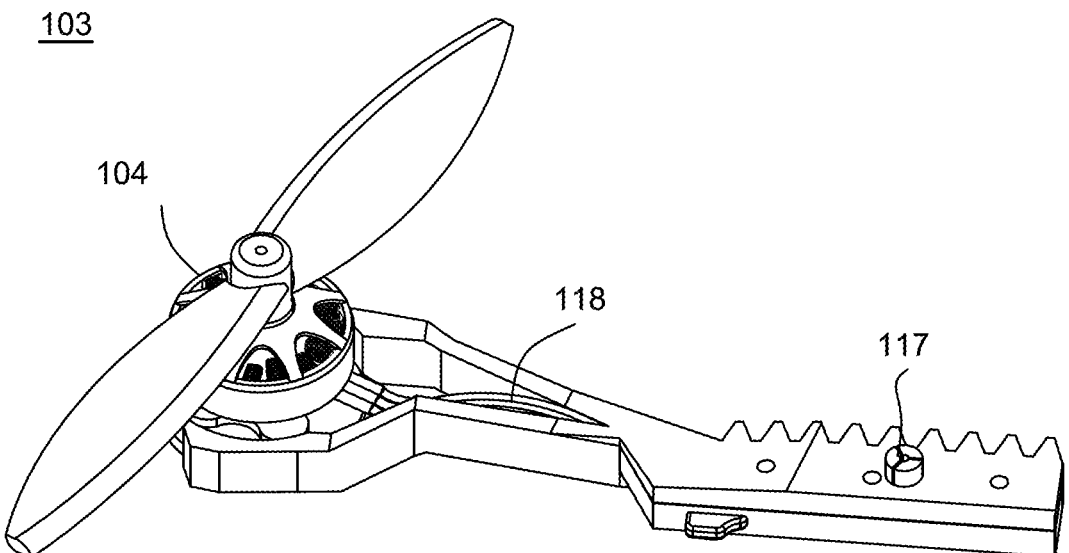

FIG. 7E specifically shows arm 103 along a horizontal axis where different components are used for powering propeller 104. In one non-limiting example, arm 103 includes electrical contact 117 that makes contact with another contact point on circuit board 106, discussed in further detail below. Electrical contact 117 may be formed of any component that is capable of conducting electricity including, but not limited to, copper, steel, silver, gold, nickel, and/or tin, among other materials. In the example shown in FIG. 7E, electrical contact 117 is formed as a cylindrical shape. However, this example is non-limiting and electrical contact 117 may take other shapes including, but not limited to, rectangular or spherical shapes.

FIG. 7E further shows wire(s) 118 that connects contact 117 to a connection point on or near propeller 104. Wire(s) 118 can be used to provide current traveling from electrical contact 117 to the propeller 104 to power each propeller 104. In one non-limiting example, the wire(s) 118 may be made of a conductive material including, at least, copper and/or aluminum. These examples are of course non-limiting and wire(s) 118 may be made of any material that can allow current to travel within the wire(s) 118. It should be further appreciated that arm 103 may use another method to control the flow of electricity to propeller 104 that does not include wire(s). For example, arm 103 may contain an integrated electrical circuit within arm 103 from contact 117 to propeller 104 that enables electrical current to flow from contact 117 to propeller 104.

Figure 7F:
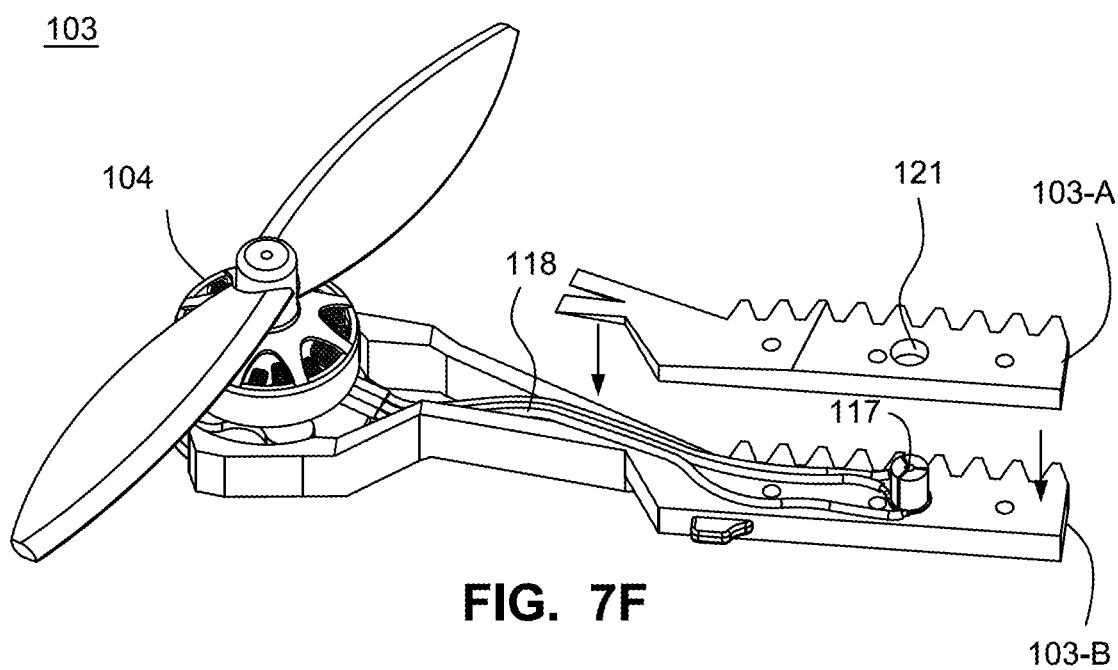

FIG. 7F shows another example view of arm 103 with different electrical components shown. FIG. 7F specifically shows an example cut-away (or exploded) view of arm 103 displayed along a horizontal axis. In the example shown in FIG. 7F, the arm 103 is shown as separated in a first arm half 103-A and a second arm-half 103-B. It should be appreciated that the arm 103 may be physically separable (i.e., where arm 103 can be physically separated into first arm half 103-A and second arm half 103-B) so that wire(s) 118 (among other components) can be accessed. Of course, arm 103 may also be integrated into a single piece and thus the example shown in FIG. 7F would be for illustrating the components sitting within a housing of arm 103. Wire(s) 118 may be seated in a manner affixed to first arm half 103-A and/or second arm half 103-B, or may be seated within grooves of first arm half-103-A and/or second arm half 103-B, among other configurations.

As can be seen in FIG. 7F, wire(s) 118 travels from contact 117 to propeller 104 as a portion of wire(s) 118 sits within the arm 103 between first arm half 103-A and second arm half 103-B. Wire(s) 118 may sit within arm 103 so that wire(s) 118 is secured within arm 103 and so that wire(s) 118 may be partially hidden from view. This example is of course non-limiting and wire(s) 118 may be "outside" or arm 103 and traveling on top, below, or even to the side of, arm 103 to connect contact 117 with propeller 104.

FIG. 7F also shows a contact hole 121 on first arm half 103-A. The contact hole 121 is dimensioned to match the shape and size of contact 117 so that contact 117 fits within contact hole 121 and first arm half 103-A and second arm half 103-B are coupled together to form arm 103. As such, contact hole 121 is shown having a circular/cylindrical shape in this example, but may be of any shape that allows contact 117 to fit within. Second arm half 103-B may also include a separate contact hole allowing contact 117 to rest within the second arm half 103-B. Likewise, second arm half 103-B may include contact 117 as an integrated component into the structure of second arm half-103-B.

Figure 7G:
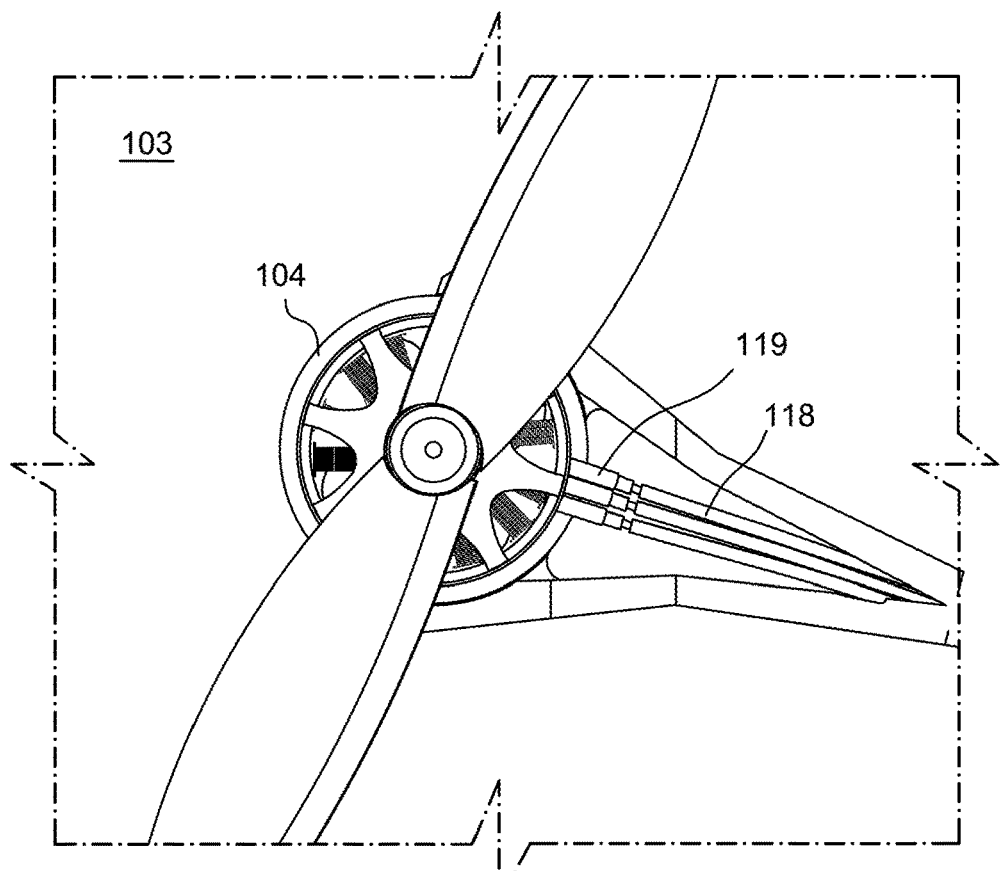
Figure 7H:
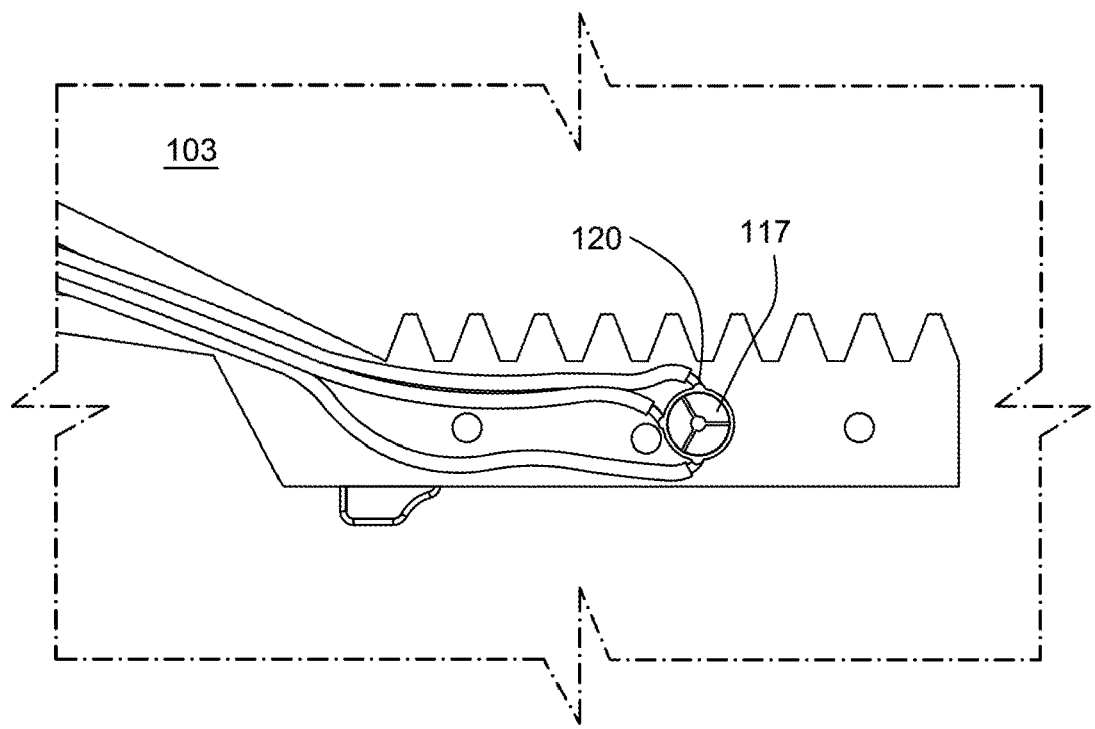

FIGS. 7G and 7H show further non-limiting examples views of arm 103. FIG. 7G specifically shows a close-up view of arm 103 near the point where arm 103 contacts propeller. Likewise, FIG. 7h specifically shows a close-up view of arm 103 near the point where electrical contact 117 sits. In the example shown in FIG. 7G, wire(s) 118 is shown as making contact with connection point 119. In one non-limiting example, connection point 119 may be a socket that physically connects the conductive wiring in wire(s) 118 so that electrical current can flow from wire(s) 118 to power propeller 104. It should be appreciated that connection point 119 may include additional internal circuitry that connects connection point 119 to portion of propeller 104 that enable powering of propeller 104.

FIG. 7H shows connection points 120 that connect to electrical contact 117. In one non-limiting example, connection points 120 may be a socket that physically connects the conductive wiring in wire(s) 118 to enable current to flow from contact 117 along wire(s) 118. Likewise, wire(s) 118 can be soldered from wire(s) to components (e.g., via welding). It should be appreciated that connection points 119 and 120 are not limited to forming a socket and can be individual contact points that attach the conductive wire(s) (e.g., copper wiring) to points on or near contact 117 and propeller 104 that allow for electrical current to flow between these components.

Figure 7I:
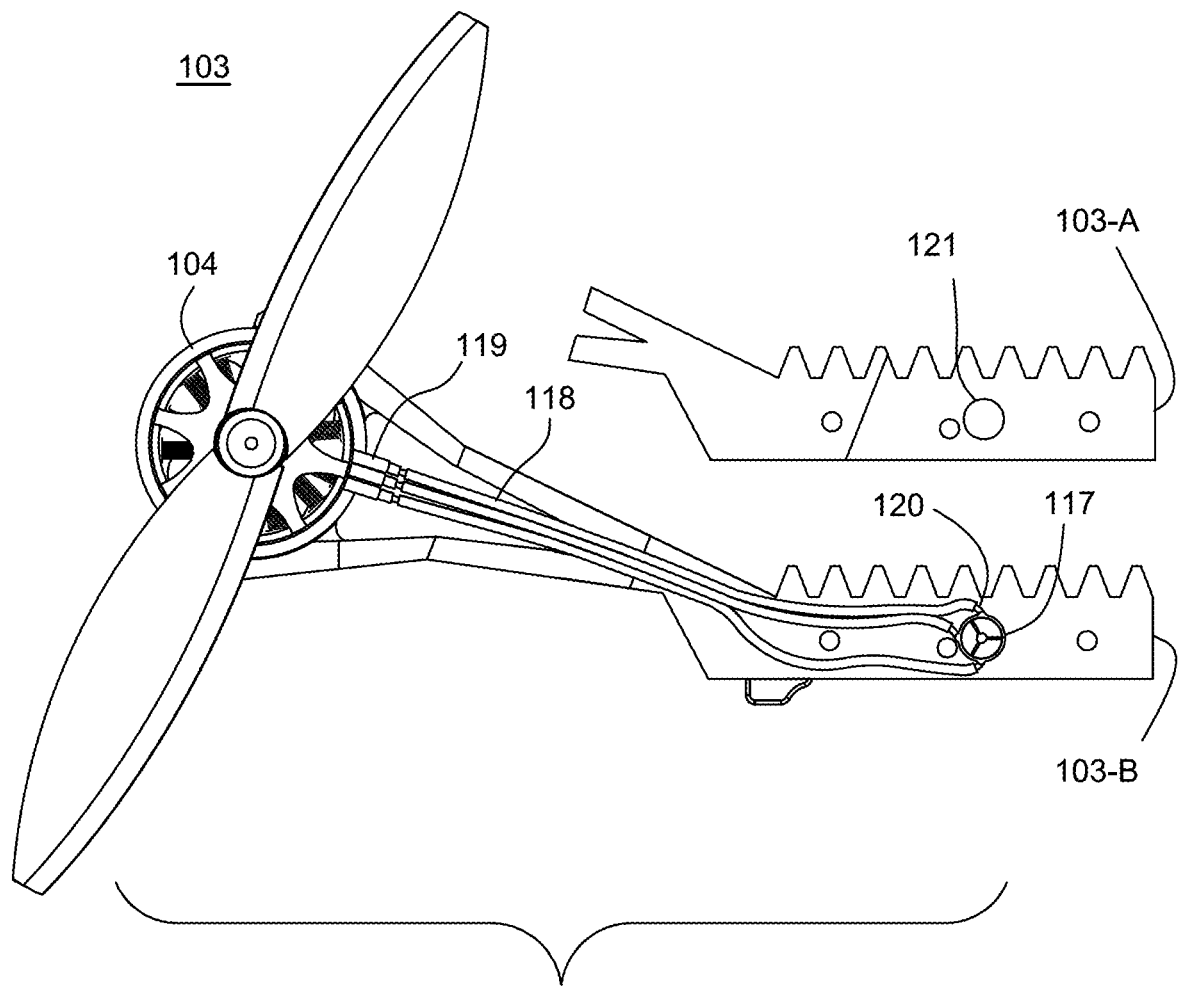
Figure 7J:
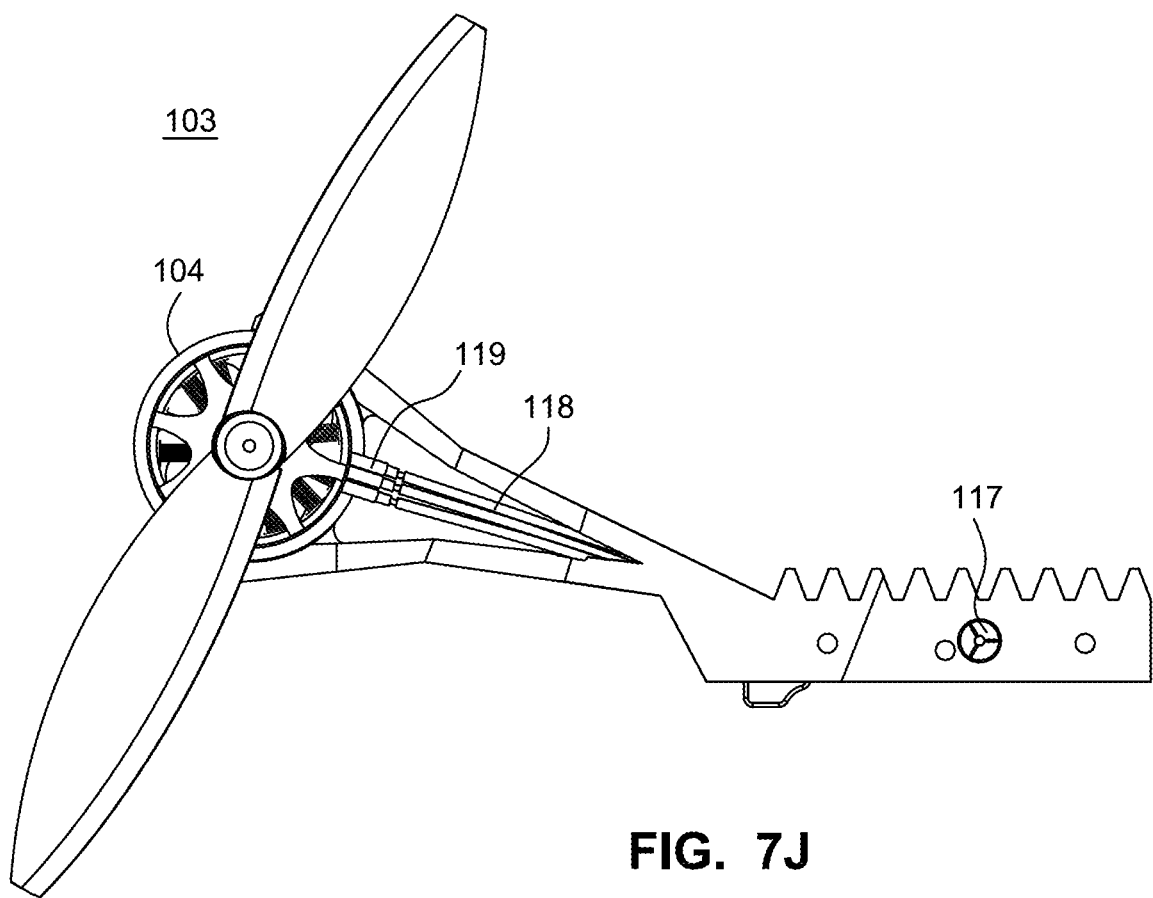

FIGS. 7I and 7J shows further non-limiting example views of arm 103. FIGS. 7I and 7J specifically show an example top view of arm 103 with a cut-away (or exploded) view and a view without cut-away, respectively. FIG. 7I shows arm 103 with hole 121 and contact 117 residing on first arm half 103-A and second arm half 103-B, respectively. As can be seen in FIG. 7I, wire(s) 118 travels between contact 117 and propeller 104 and makes connection at connection points 119 and 120. In doing so, arm 103 can allow for electrical current to travel alone 118 from contact 117 in order to power propeller 104. FIG. 7J shows arm 103 with first arm half 103-A and second arm half 103-B coupled together (thereby forming arm 103). In the example shown in FIG. 7J, a portion of wire(s) 118 is hidden and thus only connection portion 119 connecting wire(s) 118 to power propeller 104 can be seen. In one non-limiting example, the wire(s) 118 will be positioned inside of arm 103 in order to secure wire(s) 118 and prevent the portion of wire(s) 118 from any damage.

Figure 8A:
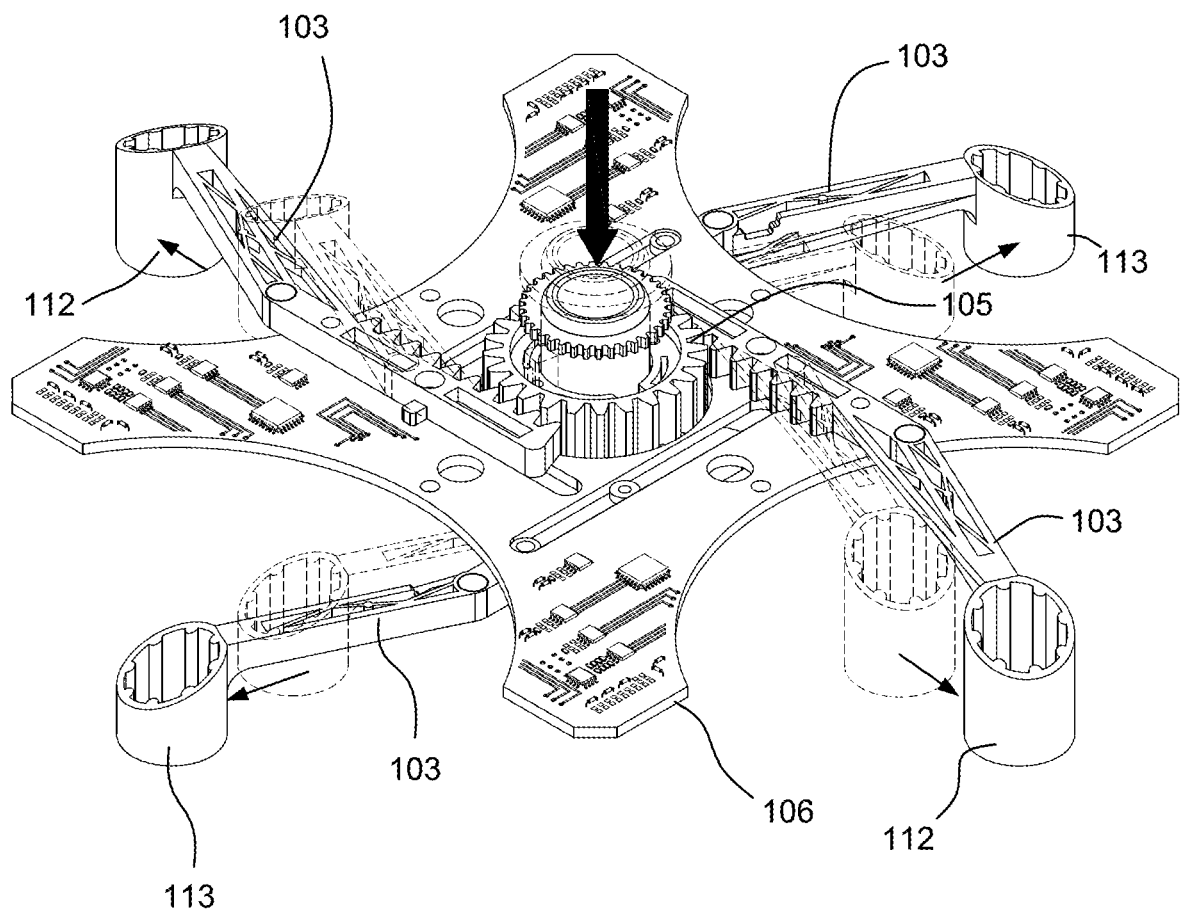
FIG. 8A-F shows a non-limiting example of the frame assembly 106 of aircraft 100.

FIGS. 8A-8F shows non-limiting examples of the frame assembly 106. FIG. 8A specifically shows a non-limiting example of aircraft 100 when arms 103 have been fully extended. In this example, the operator of aircraft 100 can press downward on button 101 to make the gear 105 move in a clockwise manner In doing so, the teeth on gear 105 will manipulate teeth on arms 103 to extend the arms 103 outward from the housing of aircraft 100. As mentioned previously, the pegs 115, 116 (and/or electrical contact 117) can be used to maneuver the arms 103 along the opening of frame assembly 106 so that the arms 103 remain aligned along the axis in which they move. Likewise, pegs 115, 116 (and/or electrical contact 117) will abut respective ends of the opening of each housing so that they do not extend too far outside or retract too far inside the housing.

It should also be appreciated that arms 103 can extend from the housing of aircraft 100 by pressing downward on the button 101. However, the technology is not limited to such an arrangement and envisions a variety of ways in which the gear 105 can rotate. For example, the button 101 can be twisted in a clockwise manner to move gear 105 and in doing so, the button 101 can also recess within the housing of aircraft 100 so that it does not extend as far from the housing. In another example, the gear can move by using an electrical touch panel along the surface of the housing of aircraft 100. For example, the touch panel can be activated by user touch to invoke an electro-mechanical operation in the gear 105 in order to rotate clockwise (or counter-clockwise).

Figure 8B:
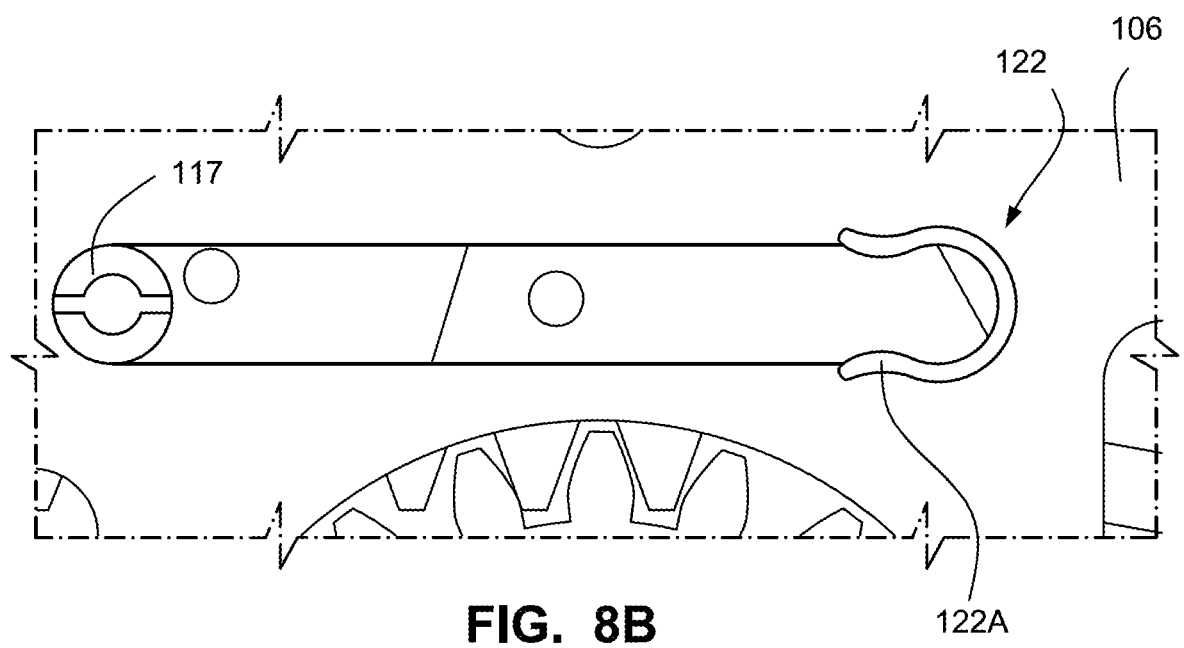

FIGS. 8B-8F shows further non-limiting example details of frame assembly 106 with different components used for powering propellers 104. FIG. 8B specifically shows a portion of printed circuit board 106 showing the aircraft in a "retracted" position. In the example shown in FIG. 8B, circuit board 106 includes a connection point 122 that allows the circuit board 106 to provide electricity at the connection point 122. The connection point 122 may be, in a non-limiting example, a vertical interconnect access (VIA) that is made of a material capable of passing an electrical current. In one non-limiting example, the VIA can be an electrical connection formed as a hole (or portion of a hole) made conductive by electroplating.

In the example shown in FIG. 8B, the connection point 122 may have a latch portion 122-A formed as part of the connection point 122. For example, the VIA (i.e., connection point 122) may include a latch portion 122-A that serves as a latch to accept the electrical contact 117 and "seat" the electrical contact 117 within the VIA (e.g., so the electrical contact 117 does not easily disconnect from the VIA). It should be appreciated that connection point 122 may be made conductive via circuitry within the circuit board 106 where circuit board 106 is receiving electrical current from a power source (e.g., a battery).

As explained throughout this document, as the arms 103 extend from the housing of the aircraft 100, portions of the arms (e.g., maneuvering pegs 115/116 and/or electrical contact(s) 117) move within a groove/opening of the circuit board 106. As the arm 103 approaches a fully extended position, electrical contact will approach connection point 122, as shown, for example, in FIGS. 8C and 8D, as well as throughout other parts of this document.

Figure 8C:
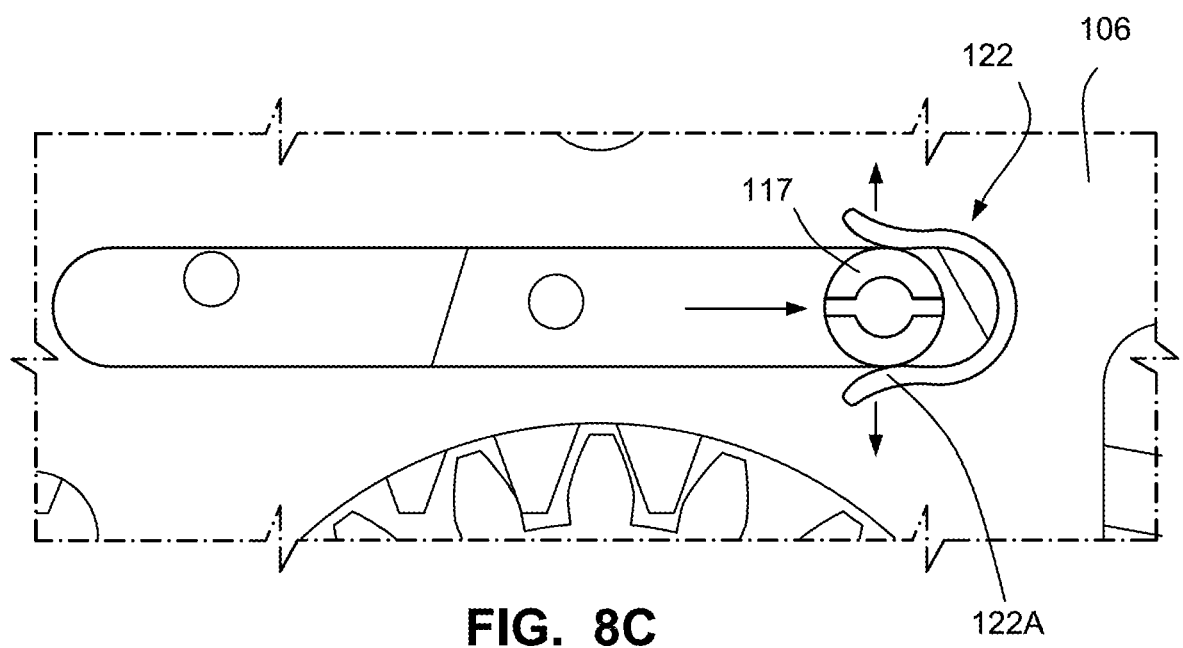
Figure 8D:
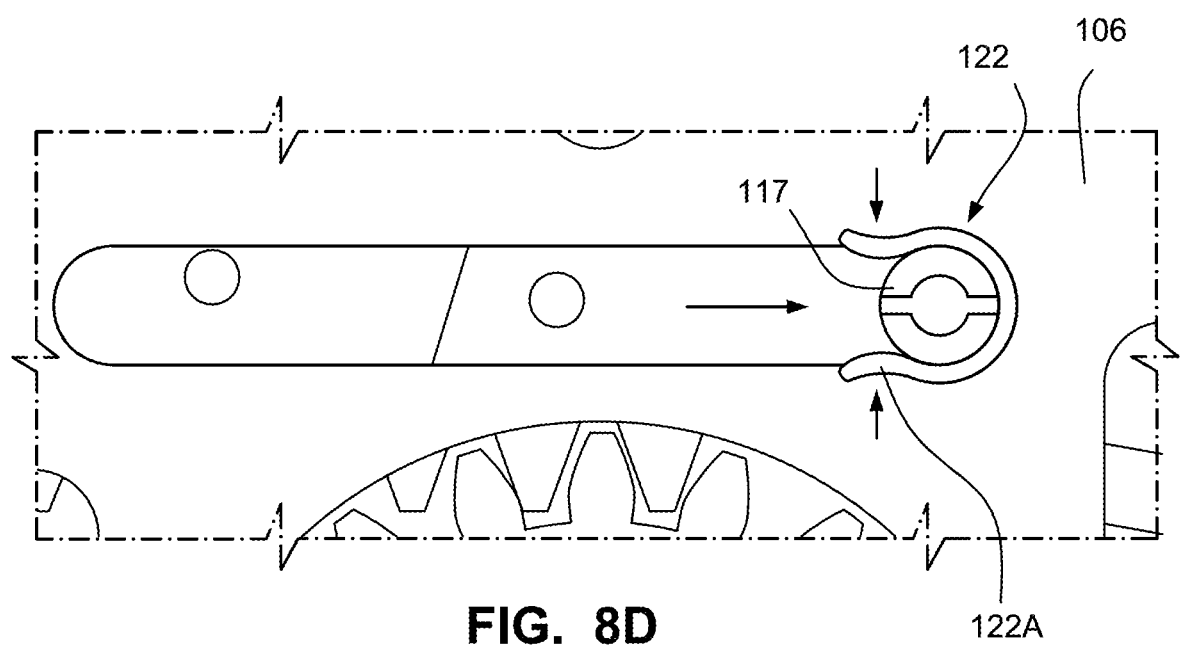

As can be seen in FIG. 8C, the electrical contact 117 (e.g., circuit head) approaches connection point 122. As the contact 117 establishes initial contact with point 122, the latch portion 122-A begins to open while contact 117 attempts to fit with connection point 122. FIG. 8D thus shows a non-limiting example, where electrical contact 117 is "seated" in place in connection point 122 and the latch portion 122-A has returned to a state similar (or the same) as that when electrical contact 117 is not making any contact with connection point 122 (e.g., as shown in FIG. 8B). In the example shown in FIG. 8D, electrical contact 117 is "seated" within connection point 122 (e.g., VIA) and latch portion 122-A move back into their original (or substantially original) position. The electrical contact 117 is "locked" into position in this configuration and is connected within a VIA (e.g., connection point 122) to "close the circuit" and allow current to flow from a power source (e.g., battery) to propellers 104. In the example shown in FIG. 8D, arm 103 has been fully extended and propeller 104 can now receive power thus allowing the propeller 104 to operate and for aircraft 100 to fly in the air. It should be appreciated that connection point 122 may show a circular (or semi-circular) VIA. However, this example is non-limiting and connection point 122 may be made of any shape allowing contact 117 to make electrical contact (and preferably be "locked" into place so as not to easily move). It should be further appreciated that when contact 117 is "seated" into connection point 122, the contact 117 is secured via the latch portion 122-A. With this configuration, contact 117 will not easily move from connection point 122 thus making operation of aircraft 100 more reliable as propeller 104 may not inadvertently lose electrical contact during operation. Likewise, contact 117 may be held in place form spring tension keeping contact 117 in position within connection point 122.

Figure 8E:
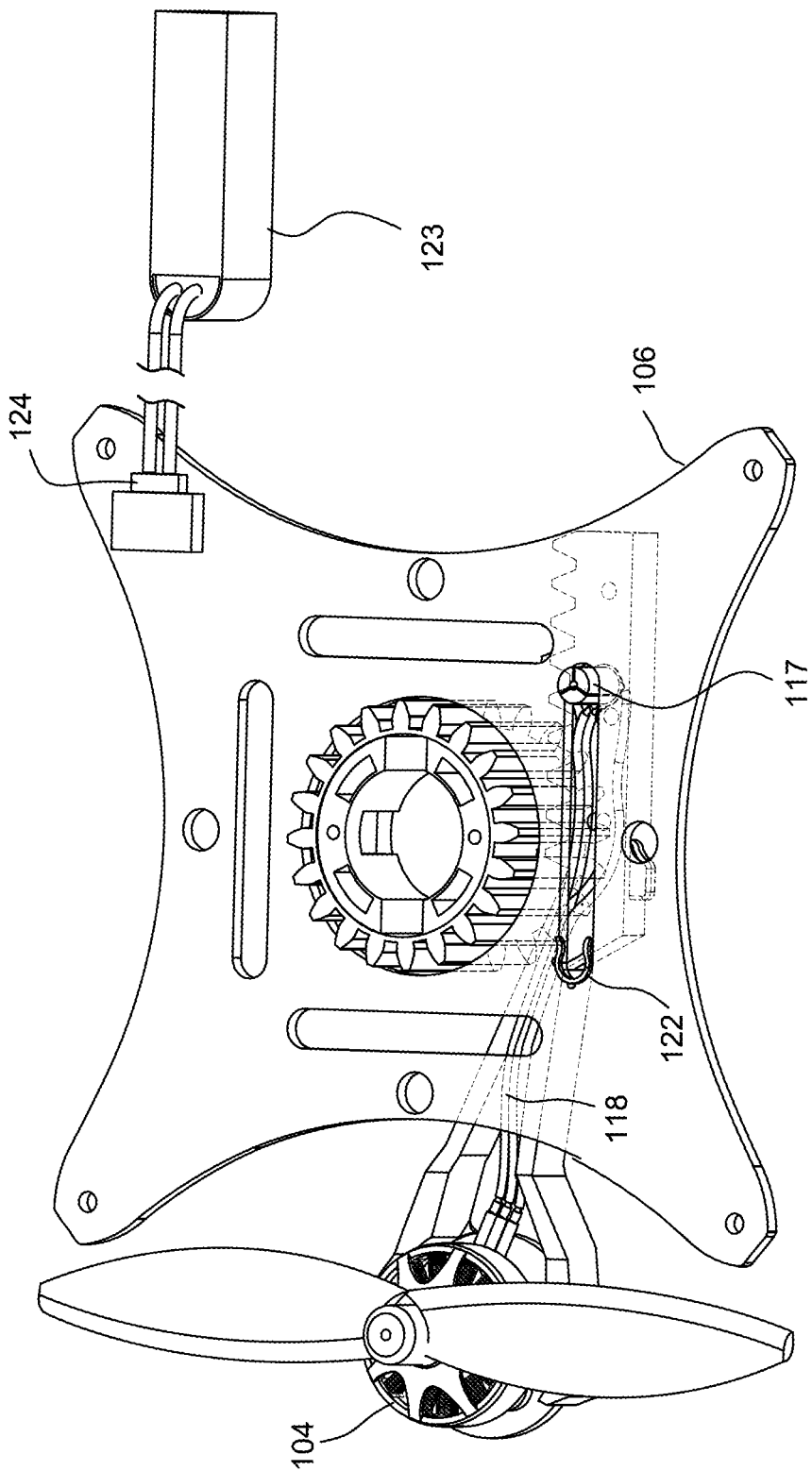
Figure 8F:
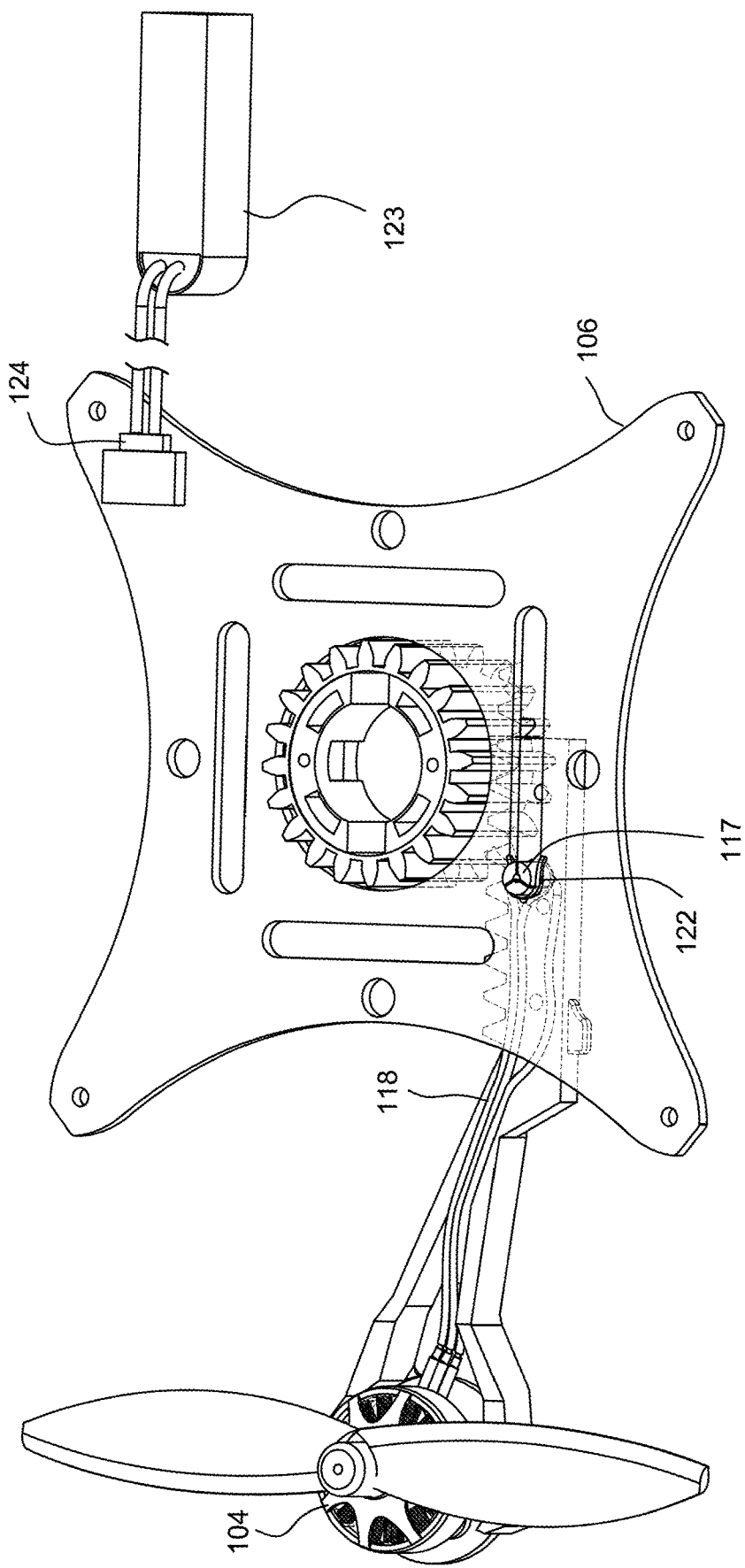

FIGS. 8E and 8F show further non-limiting example diagrams of circuit board 106 from another view. FIG. 8E specifically shows a top view of board 106 when arm 103 is fully retracted. FIG. 8E includes an example power source 123 for providing power to components of circuit board 106 as well as propellers 104. In the example shown in FIG. 8E (as well as FIG. 8F), power source 123 may be a battery. This example is of course non-limiting and power source 123 may be any source providing electrical power.

As can be seen in FIG. 8E (as well as FIG. 8F), power source 123 connects to connection point 124 on circuit board 106 using wires. This example is of course non-limiting and power source 123 can connect to circuit board 106 using a variety of methods. For example, power source 123 may be physically integrated on circuit board 106 and directly providing power to different elements associated with circuit board 106. It should be appreciated that power source 123 may be physically removable from circuit board 106 (e.g., by disconnecting wires from connection portion 124). Likewise, power source 123 may be instead insertable into a compartment with the housing of aircraft 100 (e.g., using disposable batteries) so as to power aircraft 100. Alternatively, power source 123 may be separately rechargeable and/or aircraft 100 may include an interface for recharging power source 123.

FIG. 8F shows a non-limiting example view of circuit board 106 when arm 103 has been fully extended. As can be seen in FIG. 8F, when arm 103 is fully extended, electrical contact 117 can make connection with connection point 122 thus enabling current to flow from power source 123 to propeller (or motor) 104. Specifically, power source 123 may provide electrical power to connection point 122 with connection with circuit board 106. When arm 103 is fully extended, contact 117 forms electrical contact with circuit board 106 via connection point 122. The electrical current can thus travel down wire(s) 118 using the connection formed between contact 117 and connection point 122 to provide power to propeller 104 thus allowing the aircraft 100 to fly in the air. The examples shown in FIGS. 8A-8F are of course non-limiting, and the technology described herein envisions any variety of methods for providing power to propeller(s) 104.

Figure 9:
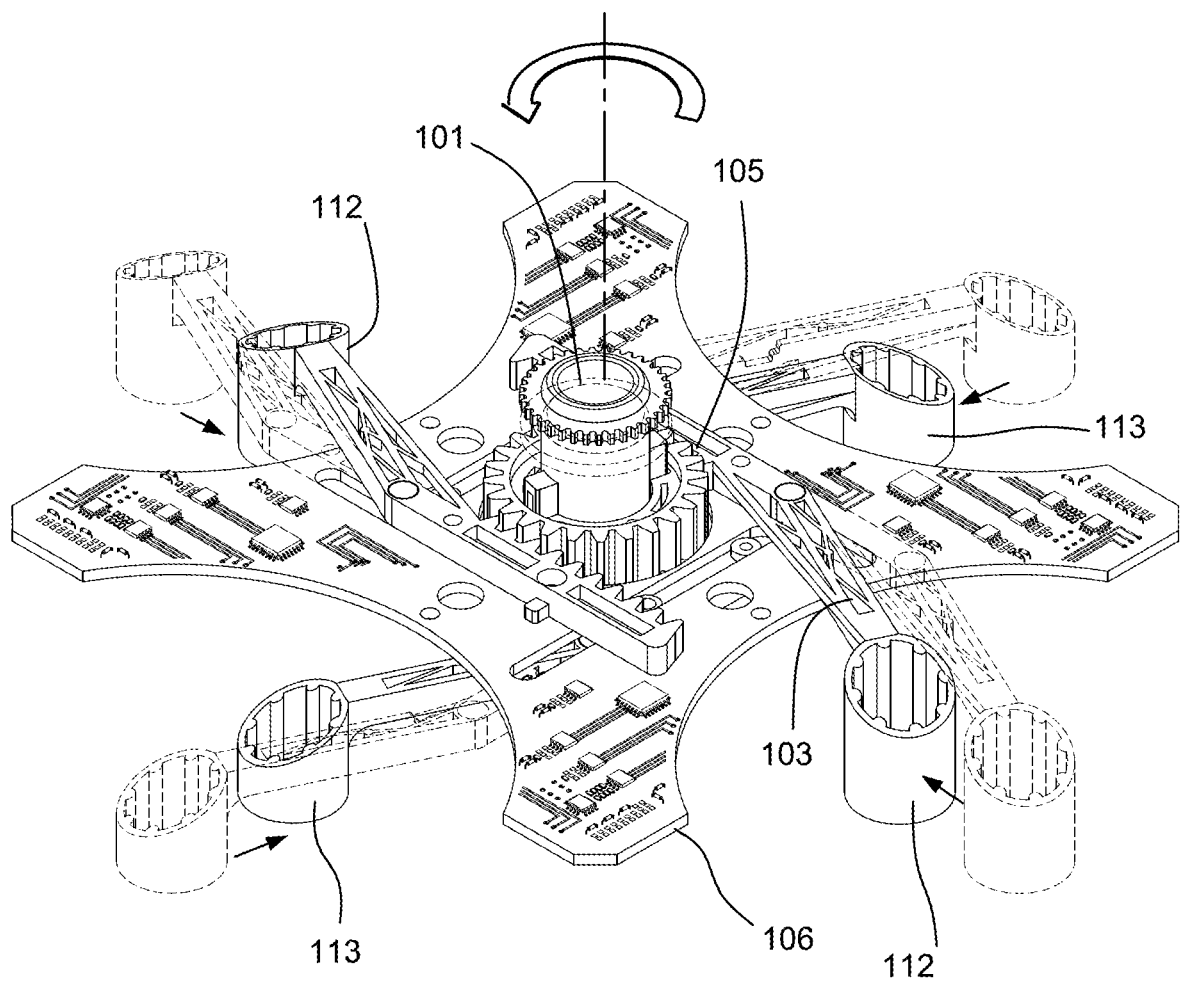
FIG. 9 shows a non-limiting example of the aircraft 100.

FIG. 9 shows another non-limiting example of the frame assembly 106 of the aircraft 100. FIG. 9 specifically shows an example when arms 103 have been fully retracted. In this example, the gear 105 moves in a counter-clockwise manner to retract arms 103 inside the housing of aircraft 100. For example, an operator could twist button 101 in a counter-clockwise manner thus causing gear 105 to rotate in the same direction. In doing so, the teeth on gear 105 will continuously abut (or mesh with) teeth on arms 103 in order to retract arms 103 inside the housing of aircraft 100. As mentioned previously, pegs 115, 116 (and/or electrical contact 117) are used to maneuver the arms 103 along openings of the assembly 106 to keep the arms 103 aligned along the axis in which they move. Pegs 115, 116 (and/or electrical contact 117) can also be used to prevent the arms 103 from retracting too far inside of the housing by having at least one of pegs 115, 116 (and/or electrical contact 117) abut an end of the opening of assembly 106.

It should be appreciated that the arms 103 can retract inside of the housing of aircraft 100 by twisting button 101 in a counter-clockwise fashion. Of course, the technology is not limited to such a technique and envisions a variety of ways in which the arms 103 can retract into the housing of aircraft 100. For example, the operator could depress button 101 to "unlock" the button 101 so that it extends from a depressed state to an extended state. In doing so, the button 101 will move in a manner causing gear 105 to rotate counter-clockwise thus retracting each arm 103. As mentioned previously, a touch panel could also be employed that causes an electro-mechanical response from gear 105 to move counter-clockwise (or clockwise) to retract arms 103.

Figure 10:
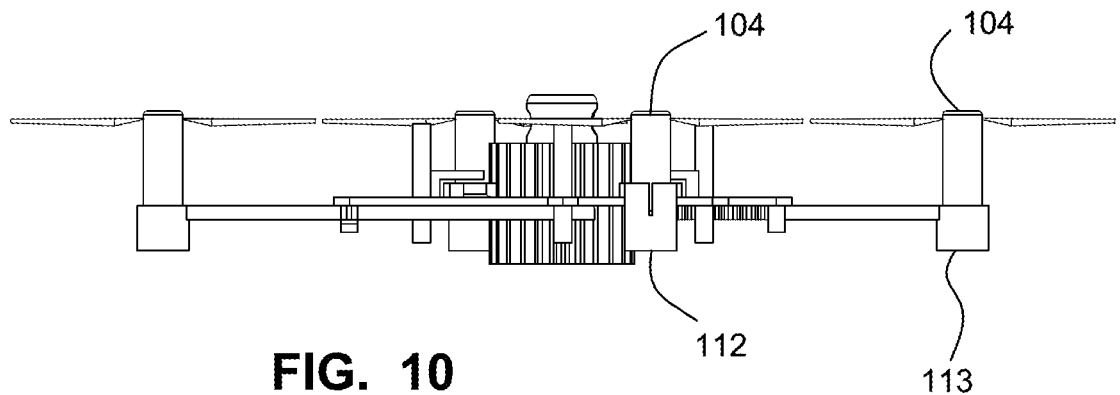
FIG. 10 shows a non-limiting example profile view of the aircraft 100.

FIG. 10 shows a non-limiting example profile view of the aircraft 100. In the example shown in FIG. 10, the propellers 104 seated in buckets 112, 113 all sit on the same horizontal plane. That is, and as discussed herein, the bottom of buckets 112, 113 are configured so that they lie on the same plane and, in this example, as the motors of the propellers 104 are all of the same height, the tops of propellers 104 will also sit on same plane. Such a configuration provides for greater aerodynamics as well as uniformity in design.

Figure 11A:
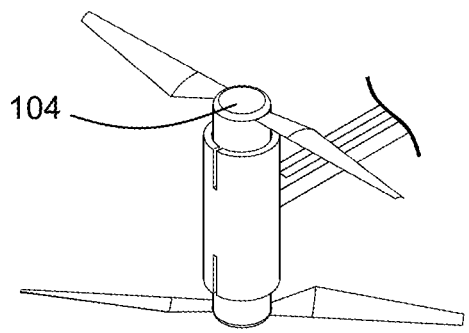
FIGS. 11A-C show non-limiting examples of different variations of the propellers 104.
Figure 11B:
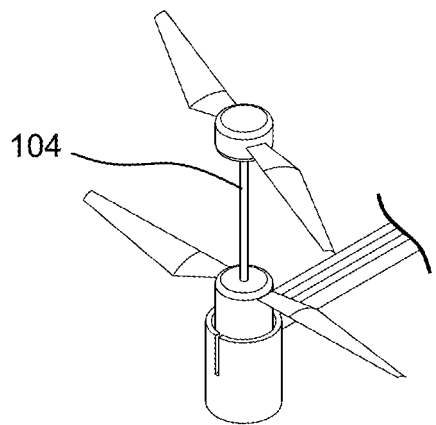
Figure 11C:
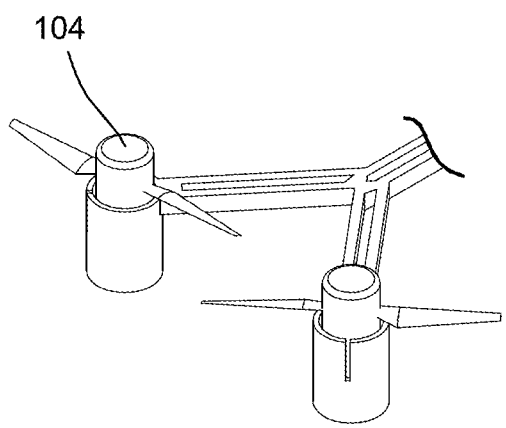

FIGS. 11A-C show non-limiting examples of different variations of the propellers 104. In each example, each leg 103 contains at least two sets of propeller 104 blades (or rotors). FIG. 11A shows an arrangement where propeller 104 contains double (tandem) rotors on each respective end of the bucket in which it is seated. FIG. 11B also shows a double (tandem) rotor arrangement, but in this instance, the "additional" rotor extends from the "base" rotor to sit above the "base" rotor. Thus, the bucket will only seat one propeller (and corresponding motor) while having the "additional" rotor extend from the "base."

FIG. 11C shows an arrangement where arm 103 is split into a "Y" shape having two buckets on each arm 103 where each bucket holds a respective propeller 104 (and corresponding motor). The double (tandem) rotor arrangement can advantageously provide better longitudinal stability for the aircraft.

Propellers 104 can contain two "blades" in the propeller assembly. However, the technology is not limited to such an arrangement and the propeller 104 can operate using a single "blade," two "blades" (e.g., as shown in FIG. 3), or any number of multiple blades. In one example, the propeller 104 could have two "blades" that have two "wings" on each "blade" thus effectively providing the propeller 104 with four total "blades." For example, each "blade" could split into two "wings" by forming a "Y" shaped "blade" thus providing four total "blades" on each arm 103 of the aircraft 100. In another example, the propeller 104 could have a double rotor configuration comprising two horizontal rotor assemblies mounted one in front of the other. Of course, this example is non-limiting and the technology described herein envisions a variety of arrangements.

Figure 12:
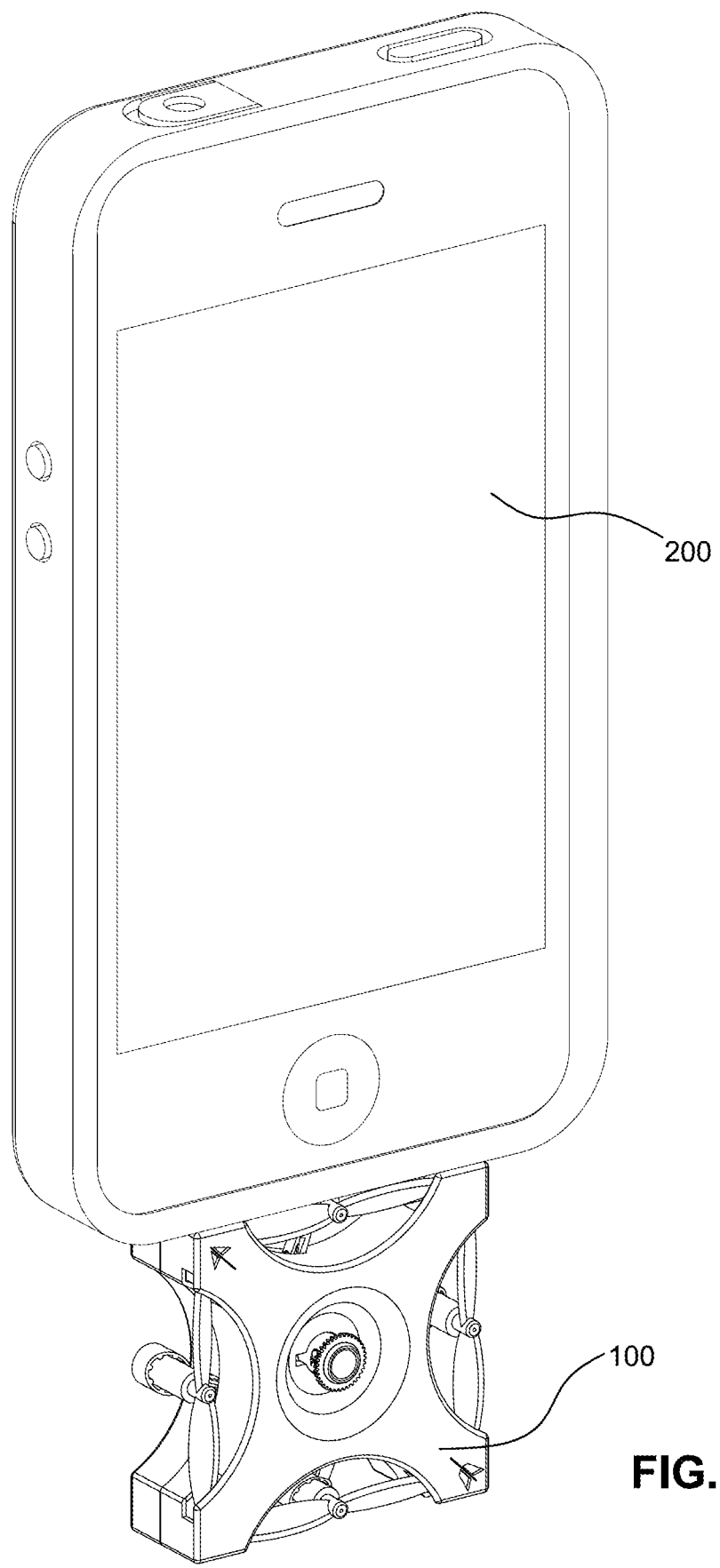
FIG. 12 shows a non-limiting example of the aircraft 100 connected to a portable electronic device 200.

FIG. 12 shows a non-limiting example of the aircraft 100 connected to a portable electronic device 200. In the example of FIG. 12, the portable electronic device 200 could include, at least, a cellular phone, a smartphone, a personal digital assistant (PDA), a tablet, a laptop computer, and/or a multimedia playing device (e.g., a music player). In this example, the aircraft 100 could attach to the device 200 and be detachably removed from the device 200. In doing so, the device 200 could use software installed on the device 200 to manipulate the aircraft 100. For example, the device 200 can wirelessly provide commands to aircraft 100 directing the aircraft 100 to move in the air in a specified manner.

The device 200 can also be used to instruct the aircraft 100 to capture video and/or audio as the aircraft 100 is being operated. In one example, the device 200 can be used to take pictures/video of different environments. For example, the aircraft 100 could be instructed to take a picture of the operator of device 200 (e.g., a "selfie"). Thus, the aircraft 100 is small enough so that it could be detachably removed from a device 200 (e.g., a smartphone) so that the user can carry aircraft 100 with them as they carry the device 200.

It should be appreciated that the technology described in this document includes many advantages and the advantages mentioned above are non-exhaustive; additionally, it should also be appreciated that while some advantages or combinations of advantages may be present in some embodiments, some advantages or combinations of advantages may not be present in other embodiments; and the advantages of particular embodiments, including those described above, should not be construed as limiting other embodiments or the Claims.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific described details. In other instances, detailed descriptions of well-known methods, devices, techniques, etc. are omitted so as not to obscure the description with unnecessary detail.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A handheld aircraft configured for aeronautical navigation, the handheld aircraft comprising:
   a housing;
   first, second, third, and fourth arms operatively coupled to the housing;
   first, second, third, and fourth propellers, wherein
      the first, second, third, and fourth propellers are operatively coupled to each of the first, second, third, and fourth arms, respectively,
      each of the first, second, third, and fourth propellers includes a propeller motor, and
      each propeller motor is connected to an electrical contact of each of the first, second, third, and fourth arms via a wire of each of the first, second, third, and fourth arms;
   a frame assembly positioned within the housing and operatively coupled to the first, second, third, and fourth arms;
   a button positioned on a first surface of the housing; and
   a control system configured to control the aeronautical navigation of the housing, wherein the frame assembly includes a plurality of openings, and each of the first, second, third, and fourth arms include maneuvering pegs configured to slide along the plurality of openings of the frame assembly, operation of the button enables the first, second, third, and fourth arms to extend from the housing to enable the aeronautical navigation of the handheld aircraft, and when the first, second, third, and fourth arms are extended from the housing, the electrical contacts associated with the first, second, third, and fourth arms establish electrical contact via electrical points associated with the frame assembly and switch each of the first, second, third, and fourth propellers to an on state by providing power to each of the first, second, third, and fourth propellers via the wire connected to the electrical contact of each of the first, second, third, and fourth arms.

2. The handheld aircraft of claim 1, further comprising at least one latch.

3. The handheld aircraft of claim 2, wherein the latch is configured to enable power to each of the first, second, third, and fourth propellers after operation of the button.

4. The handheld aircraft of claim 1, further comprising:
at least one spring, wherein
operation of the at least one spring causes at least one of the first, second, third, and fourth arms to deploy from the housing.

5. The handheld aircraft of claim 4, wherein operation of the button causes the spring to deploy the at least one of the first, second, third, and fourth arms from the housing.

6. The handheld aircraft of claim 1, further comprising:
a printed circuit board operatively coupled to the frame assembly; and
a battery operatively coupled to the printed circuit board.

7. The handheld aircraft of claim 1, wherein
the wire of each of the first, second, third, and fourth arms is configured to allow electrical current to run in the wires and along each of the arms.

8. A system, comprising:
handheld aircraft configured for aeronautical navigation, wherein the handheld aircraft includes:
a housing;
a plurality of arms operatively coupled to the housing;
a plurality of propellers, wherein
the plurality of propellers are operatively coupled to each of the plurality of arms,
each propeller, of the plurality of propellers, include a propeller motor, and
each propeller motor is connected to an electrical contact of each of the plurality of arms via a wire of each of the plurality of arms;
a frame assembly positioned within the housing and operatively coupled to the plurality of arms;
a button positioned on a first surface of the housing; and
a control system configured to control the aeronautical navigation of the housing, wherein
the frame assembly includes a plurality of openings, and each of the plurality of arms include maneuvering pegs configured to slide along the plurality of openings of the frame assembly,
operation of the button enables the plurality of arms to extend from the housing to enable the aeronautical navigation of the handheld aircraft, and
when the plurality of arms are extended from the housing, the electrical contacts associated with the plurality of arms establish electrical contact via electrical points associated with the frame assembly and switch each of the plurality of propellers to an on state by providing power to each of the plurality of propellers via the wire connected to the electrical contact of each of the plurality of arms; and
an electronic device configured to communicate with the aircraft via the control system.

9. The system of claim 8, wherein the handheld aircraft further includes at least one latch.

10. The system of claim 9, wherein the latch is configured to enable power to each of the plurality of propellers after operation of the button.

11. The system of claim 8, wherein the handheld aircraft further includes:
at least one spring, wherein
operation of the at least one spring causes at least one of the plurality of arms to deploy from the housing.

12. An aircraft configured for aeronautical navigation, the aircraft comprising:
a housing;
at least one arm operatively coupled to the housing;
at least one propeller, wherein
the at least one propeller is operatively coupled to the at least one arm,
the at least one propeller includes a propeller motor,
the propeller motor is connected to an electrical contact of the at least one arm via a wire of the at least one arm;
a frame assembly positioned within the housing and operatively coupled to the at least one arm;
a button positioned on a first surface of the housing; and
a control system configured to control the aeronautical navigation of the housing, wherein
the frame assembly includes a plurality of openings, and the at least one arm includes maneuvering pegs configured to slide along the plurality of openings of the frame assembly,
operation of the button enables the at least one arm to extend from the housing to enable the aeronautical navigation of the aircraft, and
when the at least one arm is extended from the housing, the electrical contact associated with the at least one arm establishes electrical contact via an electrical point associated with the frame assembly and switches the at least one propeller to an on state by providing power to the at least one propeller via the wire connected to the electrical contact of the at least one arm.

13. The aircraft of claim 12, further comprising at least one latch.

14. The aircraft of claim 13, wherein the at least one latch is configured to enable power to the at least one propeller after operation of the button.

15. The handheld aircraft of claim 1, wherein when the first, second, third, and fourth arms are fully retracted, each of the first, second, third, and fourth arms sit within inside of a portion of the housing.

16. The system of claim 8, wherein when the plurality of arms are fully retracted, each of the plurality of arms sit within inside of a portion of the housing.

17. The aircraft of claim 12, wherein when the at least one arm is fully retracted, the at least one arm sits within inside of a portion of the housing.

* * * * *